(12) United States Patent
Katar et al.

(10) Patent No.: US 9,438,382 B2
(45) Date of Patent: *Sep. 6, 2016

(54) VARIABLE RESPONSE INTERFRAME SPACE IN COMMUNICATION SYSTEMS

(71) Applicant: QUALCOMM Incorporated, San Diego, CA (US)

(72) Inventors: Srinivas Katar, Gainesville, FL (US); Lawrence Winston Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 14/085,583

(22) Filed: Nov. 20, 2013

(65) Prior Publication Data

US 2015/0139248 A1    May 21, 2015

(51) Int. Cl.
| | |
|---|---|
| *H04L 1/16* | (2006.01) |
| *H04W 28/06* | (2009.01) |
| *H04L 1/00* | (2006.01) |
| *H04L 1/18* | (2006.01) |
| *H04L 12/413* | (2006.01) |
| *H04W 84/12* | (2009.01) |
| *H04L 5/00* | (2006.01) |

(52) U.S. Cl.
CPC ........... *H04L 1/1607* (2013.01); *H04L 1/0042* (2013.01); *H04L 1/1628* (2013.01); *H04L 1/1854* (2013.01); *H04L 5/0053* (2013.01); *H04L 5/0091* (2013.01); *H04L 12/413* (2013.01); *H04W 28/06* (2013.01); *H04W 84/12* (2013.01); *H04L 1/0003* (2013.01); *H04L 5/0007* (2013.01)

(58) Field of Classification Search
CPC .. H04W 84/12; H04W 28/06; H04L 1/1635; H04L 12/413; H04L 1/1854; H04L 1/1628; H04L 5/0053; H04L 1/1607
USPC .................................................. 370/465, 470
See application file for complete search history.

(56) References Cited

U.S. PATENT DOCUMENTS

| | | |
|---|---|---|
| 6,671,284 B1 | 12/2003 | Yonge, III et al. |
| 7,263,105 B2 | 8/2007 | Trainin |
| 7,668,102 B2 | 2/2010 | Li et al. |
| 7,907,614 B2 | 3/2011 | Fischer et al. |
| 8,116,290 B2 | 2/2012 | Moorti et al. |

(Continued)

OTHER PUBLICATIONS

U.S. Appl. No. 14/085,527 Office Action, Sep. 17, 2015, 12 pages.

(Continued)

*Primary Examiner* — Habte Mered
*Assistant Examiner* — Rownak Islam
(74) *Attorney, Agent, or Firm* — DeLizio Law, PLLC

(57) ABSTRACT

A Response Interframe Space (RIFS) time period may be adapted in a communication system. The RIFS time period may be based, at least in part, on channel conditions (e.g., data rate) between a first device and a second device. The RIFS may be optimized in consideration of channel conditions for a particular communications channel and/or characteristics of a particular physical layer transmission. In one embodiment, the RIFS may be dependent on characteristics of a final modulation symbol in a physical layer transmission. The final modulation symbol may include more than one PHY blocks (PBs) or portions of PBs. The RIFS may depend on a number of PBs that end in the final modulation symbol.

28 Claims, 16 Drawing Sheets

(56) References Cited

U.S. PATENT DOCUMENTS

| | | | |
|---|---|---|---|
| 8,493,995 | B2 | 7/2013 | Krishnam et al. |
| 9,231,736 | B2 | 1/2016 | Avudainayagam et al. |
| 2005/0135295 | A1* | 6/2005 | Walton et al. ........ H04W 74/00 370/328 |
| 2007/0171933 | A1 | 7/2007 | Sammour et al. |
| 2011/0267956 | A1* | 11/2011 | Yonge, III ............ H04L 12/413 370/241 |
| 2011/0268161 | A1 | 11/2011 | Yonge, III et al. |
| 2011/0280332 | A1 | 11/2011 | Yonge, III |
| 2012/0320931 | A1 | 12/2012 | Vedantham et al. |
| 2013/0287040 | A1 | 10/2013 | Katar et al. |
| 2015/0138999 | A1 | 5/2015 | Avudainayagam et al. |

OTHER PUBLICATIONS

International Application No. PCT/US2014/065534 International Search Report and Written Opinion, Mar. 3, 2015, 15 pages.

PCT Application No. PCT/US2014/066065 International Search Report, Feb. 26, 2015, 12 pages.

U.S. Appl. No. 14/085,527 Office Action, Apr. 1, 2015, 15 pages.

Convertino, et al., "An Adaptive FEC Scheme to Reduce Bursty Losses in a 802.11 Network", Global Telecommunications Conference. 2006, Globecom '06, IEEE, IEEE. PI, Nov. 1, 2006, pp. 1-6.

Geldmacher, et al., "Hard decision based low SNR early termination for LTE Turbo decoding", Wireless Communication Systems (ISECS),2011 8th International Symposium on, IEEE,, Nov. 6, 2011, pp. 26-30.

Lee, et al., "HomePlug 1.0 Powerline Communication LANs—Protocl Description and Performance Results version 5.4", Home plug 1.0 Powerline Communication LANs-Protocol Description and performance result, version 5.4, revised 18th Sep. 2002, 25 pages, Sep. 18, 2002.

Co-pending U.S. Appl. No. 14/085,527, filed Nov. 20, 2013, 60 pages.

"PCT Application No. PCT/US2014/065534 International Preliminary Report on Patentability", Jun. 2, 2016, 11 pages.

"PCT Application No. PCT/US2014/066065 International Preliminary Report on Patentability", Jun. 2, 2016, 10 pages.

* cited by examiner

| CHANNEL CONDITIONS | POOR QUALITY CHANNEL | GOOD QUALITY CHANNEL |
|---|---|---|
| DATA RATE | LOWER | HIGHER |
| NUMBER OF PBS THAT END IN LAST MODULATION SYMBOL | LESS | MORE |
| ADJUSTMENT TO RIFS | POSSIBLE DECREASE TO RIFS IF LESS TIME NEEDED TO DECODE FEWER PBS THAT END IN LAST MODULATION SYMBOL | POSSIBLE INCREASE TO RIFS TO ALLOW MORE TIME TO DECODE GREATER QUANTITY OF PBS THAT END IN LAST MODULATION SYMBOL |

FIG. 5

VARIABLE RESPONSE INTERFRAME SPACE IN COMMUNICATION SYSTEMS

BACKGROUND

Embodiments of the disclosed subject matter generally relate to the field of communication systems, and, more particularly, to variable response interframe space in a communication system.

Communication systems may utilize a communication protocol which defines how information is communicated from a first device to a second device via a communications medium. The communications medium may be wired or wireless and may be associated with a physical layer protocol. Upper layer data (such as a media access control, MAC, layer data) may be divided, encapsulated, segmented, encoded and/or encrypted by the physical layer protocol to prepare a physical layer transmission. The physical layer transmission may be communicated via the communications medium from the first device (e.g., a transmitting device) to the second device (e.g., receiving device). An acknowledgment scheme may be used such that the second device can indicate whether the second device has successfully received one or more portions of the physical layer transmission. The acknowledgment may be sent from the second device as soon as practical after receiving the each physical layer transmission or after receiving a series of physical layer transmission.

A response interframe space (referred to as Response Interframe Space, or RIFS) is a time period following physical layer transmission during which the first and second devices refrain from transmitting on the communications medium. The RIFS time period may be used by the second device to process the physical layer transmission and generate an acknowledgment message. Because no packet transmission occurs during the RIFS time period, the communications medium is idle. As such, the RIFS time period may be considered overhead for the communication system. Conventional communication systems may define the RIFS based on a standardized time period so that the various devices that use the communications medium utilize the same RIFS as a fixed value. In some communication systems, the RIFS may be a predefined system parameter based on the network technology associated with the communication system.

SUMMARY

Various embodiments are provided in which a response interframe space may be variable in a communication system. The response interframe space may be determined based at least in part on channel conditions and/or transmission characteristics of a transmission from a first device to a second device.

In one embodiment, a communication device may receive, via a communications medium, a physical layer (PHY) protocol data unit (PPDU) that includes multiple PHY blocks (PBs). The PPDU may be received as a series of modulation symbols. The communication device may send, via the communications medium, an acknowledgment message responsive to receiving the PPDU after a response interframe space (RIFS) time period following a final modulation symbol of the PPDU. The final modulation symbol of the PPDU may have more than one PHY block. The RIFS time period may be based, at least in part, on a quantity of PHY blocks that end in the final modulation symbol.

BRIEF DESCRIPTION OF THE DRAWINGS

The present embodiments may be better understood, and numerous objects, features, and advantages made apparent to those skilled in the art by referencing the accompanying drawings.

FIG. 5 depicts a table illustrating two scenarios in which a response interframe space may be adapted based on channel conditions in accordance with an embodiment of this disclosure.

DESCRIPTION OF EMBODIMENT(S)

The description that follows includes exemplary systems, methods, techniques, instruction sequences and computer program products that embody techniques of the present subject matter. However, it is understood that the described embodiments may be practiced without these specific details. In other instances, well-known instruction instances, protocols, structures and techniques have not been shown in detail in order not to obfuscate the description.

The RIFS constitutes an overhead to communication. A system-wide preconfigured RIFS time period may be unnecessarily long and may reduce overall throughput. A system-wide preconfigured RIFS time period that is too short may inhibit the receiving device from processing the physical layer transmission and preparing an acknowledgment message. Communication systems may benefit from keeping the RIFS as small as possible, but long enough for a receiver to complete decoding operations. Adapting the RIFS for particular transmissions and/or devices may result in a more efficient use of the communications medium.

In accordance with an embodiment of this disclosure, a RIFS time period may be adapted in a communication system. The RIFS time period may be based, at least in part, on channel conditions (e.g., PHY data rate) between the first device (e.g., transmitting device) and a second device (e.g., receiving device). Performance of a communications medium may be improved by selecting an appropriate RIFS based on characteristics of a transmission. The RIFS time period may be different than a standardized preconfigured system parameter. As such, the RIFS may be optimized in consideration of channel conditions for a particular communications channel and/or characteristics of a particular physical layer transmission.

In accordance with an embodiment of this disclosure, the RIFS may be dependent on characteristics of a final modulation symbol used to transmit each PPDU. A final modulation symbol may include more than one PHY blocks (PBs) or portions of PBs. The RIFS may depend on a processing time associated with decoding PBs that end in the final modulation symbol. For example, the RIFS may depend on a number of PBs that end in the final modulation symbol, since decoding and processing delay may depend on a quantity of PBs. In some communication systems, a higher RIFS may be used for transmissions which include more PBs in the final modulation symbol than a lower RIFS used for transmissions that include less PBs in the final modulation symbol. The RIFS may be determined based, at least in part, on a threshold value or a lookup table that has a relationship between RIFS and quantity of PBs in a final modulation symbol. In one embodiment, the maximum number of PBs that can end in the final modulation symbol may be indicated as part of a tone map message, or other management message.

Figure 1:
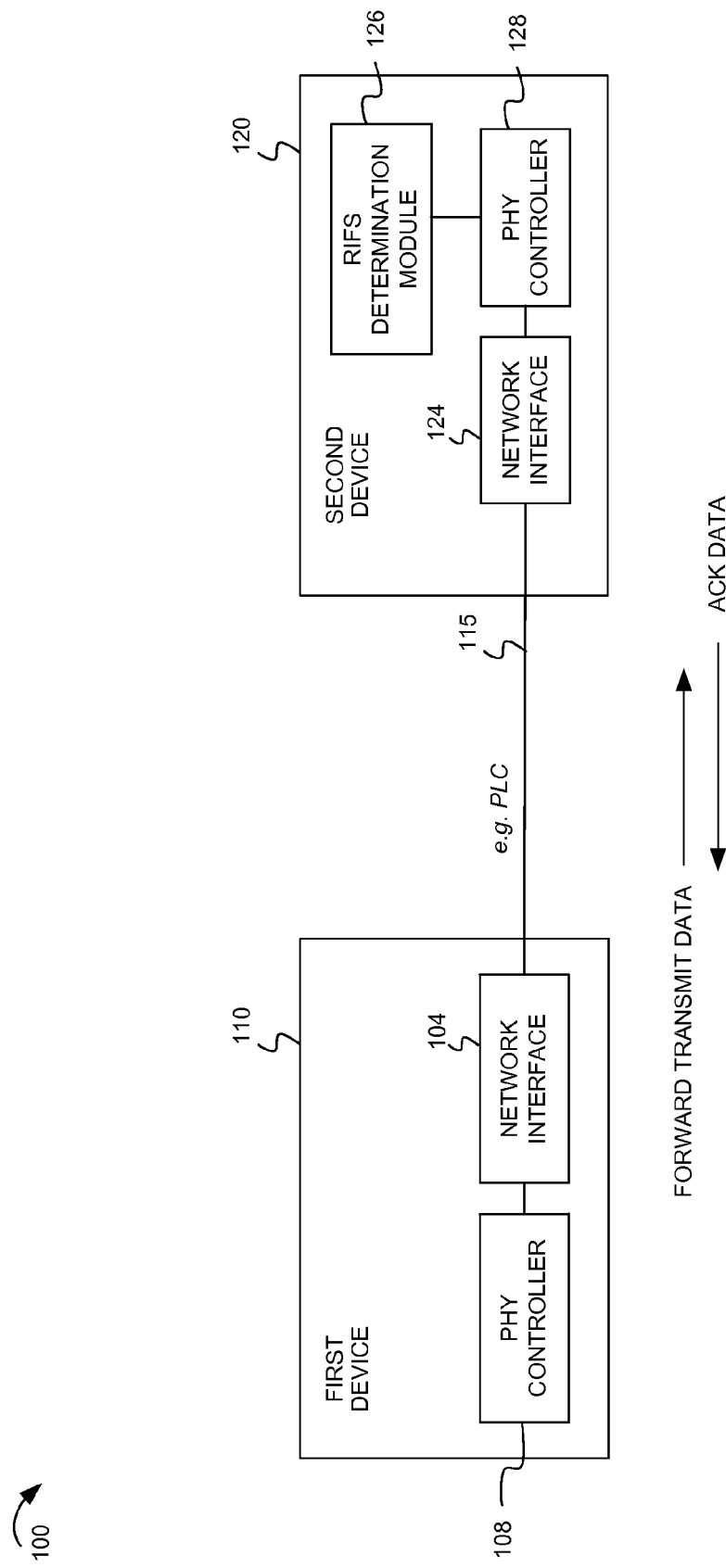
FIG. 1 depicts an example communication system in accordance with an embodiment of this disclosure.

FIG. 1 depicts an example communication system 100 in which various embodiments of this disclosure may be introduced. The example communication system 100 includes a first device 110 and a second device 120. The first device 110 may comprise a PHY controller 108 and network interface 104. The network interface 104 may include a transceiver (or separate transmitter and receiver components) for transmitting and receiving communications via a communications medium 115. The PHY controller 108 may control the network interface 104 and manage settings, such as RIFS, modulation and coding scheme, acknowledgment scheme, or other configurations used by the network interface 104 to communicate with a corresponding network interface 124 at the second device 120. Network interface 104 may be coupled to a communications medium 115. The network interface 124 is also coupled to the communications medium 115. In the example communication system 100, the communications medium 115 may be a powerline communications (PLC) medium. However, the communications medium 115 may be other types of communications medium, and may be wired or wireless in various alternative implementations. Similar to the first device 110, the second device 120 may include a PHY controller 128.

The second device 120 may also include a RIFS determination module 126 configured to implement various features of this disclosure. The RIFS determination module 126 may determine the RIFS based, at least in part, on a quantity of PBs that end in a final modulation symbol of a physical layer transmission from the first device 110. For example, FIGS. 8A-8D illustrate different scenarios showing how many PBs end in the final modulation symbol of a physical layer transmission. Other examples of factors that may be used to determine the RIFS are in FIG. 4.

In the example communication system 100, the first device 110 may be referred to as a transmitting device and the second device 120 may be referred to as a receiving device. The first device 110 may transmit data in the "forward" direction, thus the data may be referred to as forward transmit data. The first device 110 may transmit the forward transmit data as a physical layer transmission via the communications medium 115 to the second device 120. The second device 120 receives the physical layer transmission and attempts to decode the physical layer transmission. In accordance with an acknowledgment scheme, the second device 120 may prepare an acknowledgment message to indicate whether the second device 120 has successfully decoded all or part of the physical layer transmission.

The first device 110 and second device 120 may maintain a timing synchronization for communications. Therefore, both the first device 110 and second device 120 may be aware of a RIFS time period. The RIFS time period defines a time period between a completion of the physical layer transmission (the forward transmit data) from the first device 110 to the second device 120 and an acknowledgment message from the second device 120 to the first device 110. The RIFS represents an idle time on the communications medium 115 during which neither the first device 110 nor the second device 120 may communicate. In accordance with an embodiment this disclosure, the RIFS determination module 126 may determine the RIFS. The first device 110 may also have a RIFS determination module (not shown).

In one embodiment, the RIFS determination module 126 may determine the RIFS prior to receiving the physical layer transmission from first device 110 and may communicate the RIFS to the first device 110 in a management message, control message, or configuration message so that both the first device 110 and second device 120 are aware of the RIFS time period. In another embodiment, the second device 120 may communicate parameters for determining the RIFS so that the first device 110 may independently determine the RIFS using a same algorithm and parameters as the second device 120. After the RIFS time period, the second device 120 may send the acknowledgment message to the first device 110.

Figure 2:
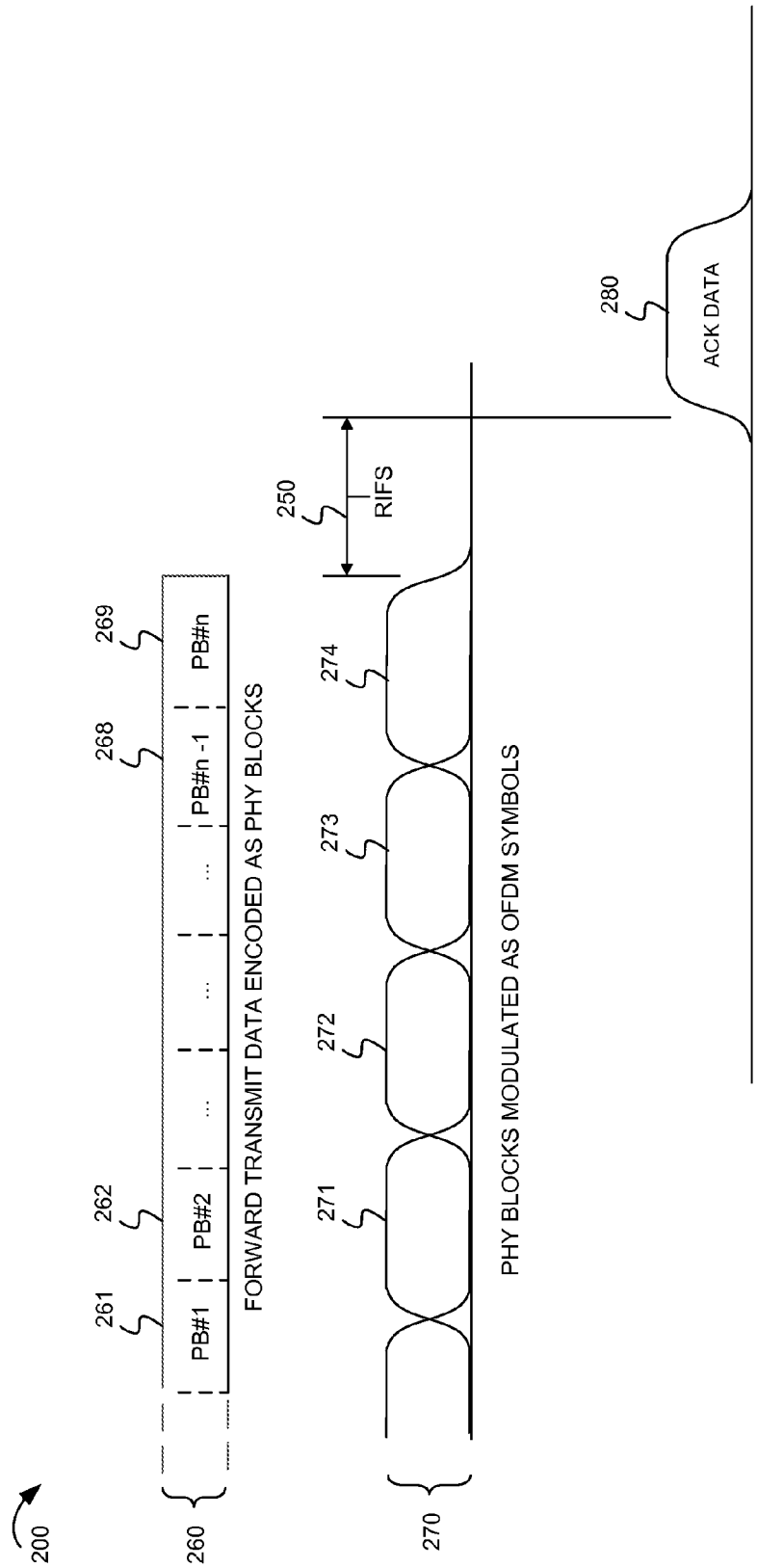
FIG. 2 depicts a relationship between forward transmit data, a response interframe space, and an acknowledgment message in accordance with an embodiment of this disclosure.

FIG. 2 depicts an illustration 200 showing a relationship between forward transmit data 260, a RIFS 250, and ACK data 280 in accordance with an embodiment of this disclosure. The forward transmit data 260 may be a physical layer transmission, such as a PPDU. The first device (not shown) may implement a PHY layer configured to prepare the PPDU based on upper layer data. In accordance with the PHY layer, the forward transmit data may be segmented into blocks, referred to as PHY blocks (PBs). Typically, each PB has a fixed or maximum length. Multiple PBs may be included as part of the payload in a PPDU. Each PB may include a sequence number and may be encoded (such as a forward error correction coding). The format of PBs is described further in FIG. 7. An encoded PB may be referred to as a forward error correction (FEC) encoded block, or simply FEC block. Each PB may include a check sequence, such as a cyclic redundancy check (CRC) that a receiving device can use to verify successful decoding of the PB. In the illustration 200, forward transmit data 260 includes PB#1 261, PB#2 262, PB#n−1 268 (representing second to final PB), and PB#n 269 (representing a final PB).

PBs may be transmitted using a modulation waveform 270 having one or more modulation symbols, such as modulation symbol 271, modulation symbol 272, modulation symbol 273, and a final modulation symbol 274. For example, the modulation symbols may comprise orthogonal frequency division multiplexing (OFDM) symbols or other symbols. OFDM is a multicarrier technology in which every OFDM symbol is comprised of many carriers. Each carrier can potentially carry a different number of bits of information depending on the channel quality for the carrier. Each symbol may comprise a group of bits from the PPDU. Depending on the PHY layer configuration, each symbol may include a portion of a PB, one PB, or more than one PB. Example relationships between PBs and modulation symbols are further described in FIGS. 8A-8D. In illustration 200, a portion of PB#n−1 268 may be included in modulation symbol 273 and a further portion of PB#n−1 268 may be included in final modulation symbol 274. The final modulation symbol 274 may also include PB#n 269. Therefore, the receiving device may identify two PBs that end in the final modulation symbol 274.

After the final modulation symbol 274, the communications medium is idle during the RIFS 250. After the RIFS 250, the receiving device may respond with ACK data 280. The ACK data 280 may be sent as a single modulation symbol (as depicted in illustration 200) or may span multiple modulation symbols, depending on the communication system configuration. A communication system may also allow for a receiving device to selectively acknowledge which of the PBs has been decoded correctly. The ACK data 280 may be referred to as a selective acknowledgment (SACK) message. The SACK message may comprise of a block acknowledgment (BA) bitmap where each bit represents an acknowledgment or negative acknowledgment of one or more PBs. In the BA bitmap, a "1" may indicate successful reception and a "0" may indicate an error in that PB. When the transmitting device receives the SACK message, it may re-transmit those PBs that were not properly received.

One purpose of the RIFS is to allow processing time for the receiving device to process the final modulation symbol 274 and prepare the ACK data 280. During the RIFS, a receiver may perform several processes. For example, a receiver may demodulate the final modulation symbol 274, decode the PBs that end in the final modulation symbol 274 (such as PB#n−1 268 and PB#n 269), check the CRC for each PB to determine whether to acknowledge or negative acknowledge each PB, generate the BA bitmap, and prepare to send the ACK data 280. The processing time for some of the receiver operations may vary with the channel conditions. For example, at one data rate, the receiving device may use more processing time to decode a final modulation symbol than at another data rate. A determinable portion of the RIFS may be allocated for decoding the PBs that end in the final modulation symbol 274 depending on the data rate or other channel conditions.

Figure 3:
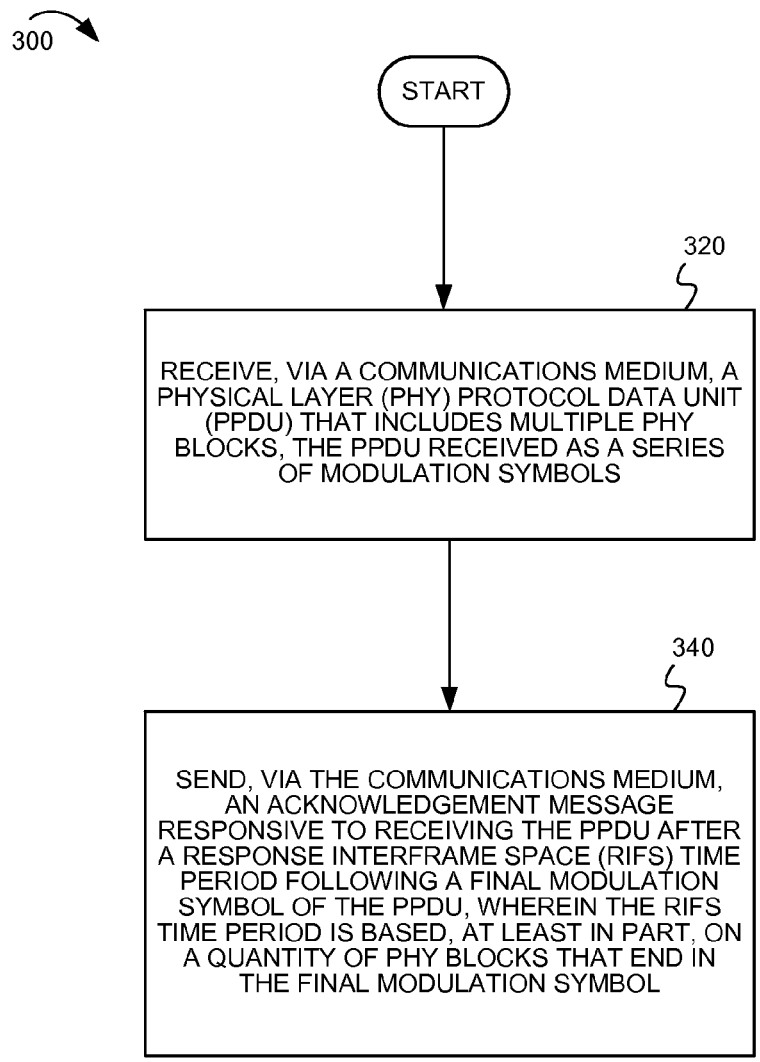
FIG. 3 depicts a flow chart with example operations related to determining a response interframe space in accordance with an embodiment of this disclosure.

FIG. 3 depicts a flow 300 with example operations related to determining the RIFS in accordance with an embodiment of this disclosure.

At block 320, a communication device (e.g., a receiver of a communication device) may receive via a communications medium, a PPDU that includes multiple PBs, the PPDU received as a series of modulation symbols. As described in FIGS. 8A-8D, the quantity of PBs and modulation symbols may not match. However, depending on channel configuration, PPDU size, PHY block length, etc., it may be possible to determine the number of PBs that end in the final modulation symbol.

At block 340, the communication device (e.g., a RIFS determination module of the communication device) may send, via the communications medium, an acknowledgment message responsive to receiving the PPDU after a RIFS time period following a final modulation symbol of the PPDU. The RIFS time period may be based, at least in part, on a quantity of PHY blocks that end in the final modulation symbol.

Figure 4:
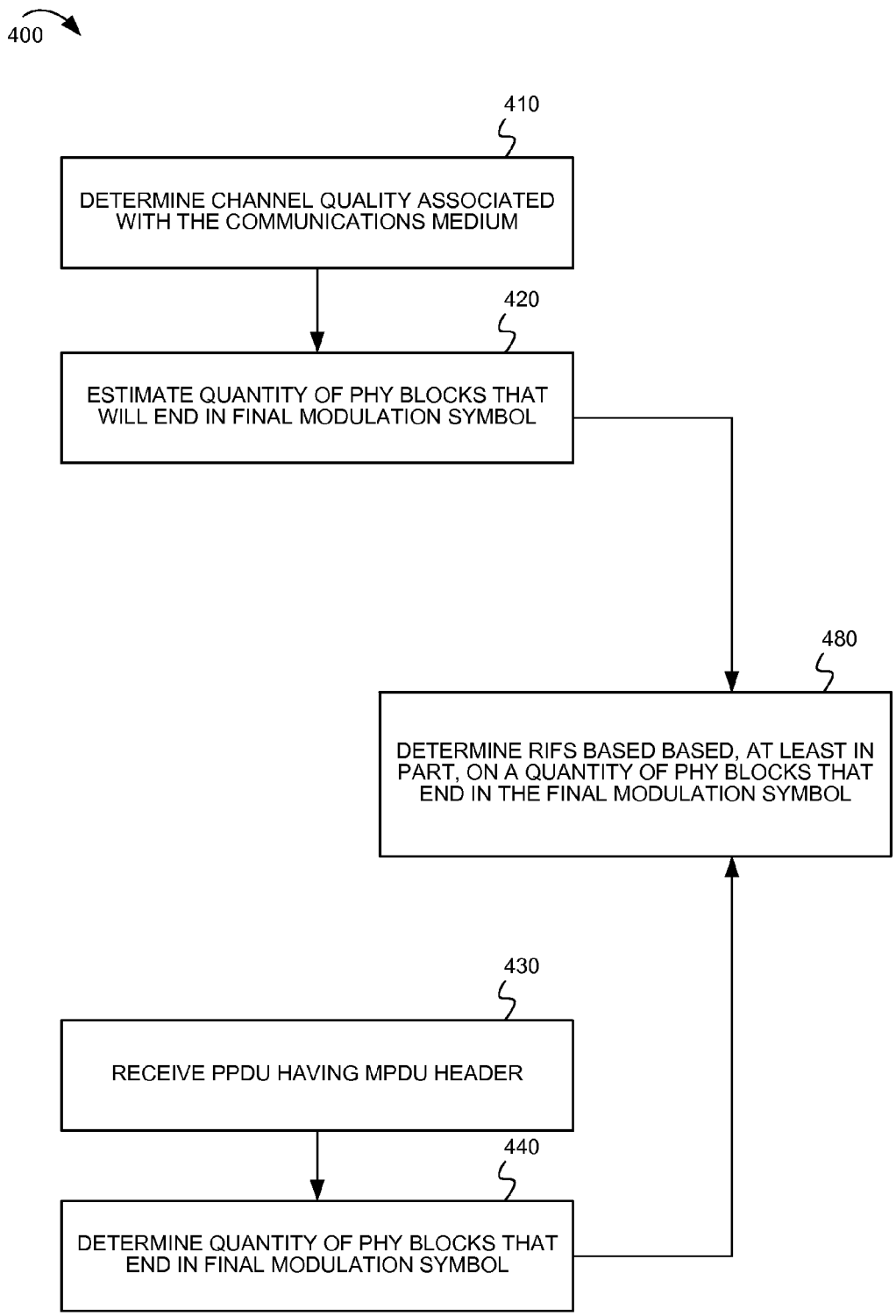
FIG. 4 depicts example operations for determining a response interframe space based on processing time in accordance with an embodiment of this disclosure.

FIG. 4 depicts an illustration 400 showing example operations for determining a response interframe space based, at least in part, on a quantity of PBs that end in a final modulation symbol of a PPDU in accordance with an embodiment of this disclosure. In various embodiments, the example operations described in blocks 410, 420, 430, 440 may be used separately, combined, or in various combinations.

Example operations at block 410 may include determining channel quality associated with the communications medium. For example, a channel estimation process may be used to measure signal attenuation or noise. The channel estimation process may be used to configure the communications channel. Configurations for the communications channel may include modulation and coding scheme (MCS) for each carrier of the communications channel, a corresponding data rate, and/or timing parameters.

Example operations at block 420 may include estimating a quantity of PBs that may end in a final modulation symbol. In one embodiment, a communication device may determine a correlation between the channel quality and the quantity of PBs that will end in a final modulation symbol, such that the RIFS may be selected from the correlation data. Alternatively, the communication device may perform calculations to determine the quantity of PBs that will end in the final modulation symbol. The calculations may use communication system configuration parameters, such as PPDU size, MCS (or corresponding symbol bit rate), PB size, a limit on quantity of PBs in the final modulation symbol, or the like. In some implementations, the operations at blocks 410, 420 may be performed prior to the communication device receiving the PPDU.

Example operations at block 430 may include receiving a PPDU. Based on a portion of the PPDU, such as PPDU length, a frame control field, or a media access control (MAC) layer protocol data unit (MPDU) header in a first PB, the communication device may determine the quantity of PBs that may end in the final modulation symbol for the PPDU at 440.

At block 480, the communication device may utilize some or all of the information from blocks 410, 420, 430, 440 to determine the RIFS. The RIFS may be based, at least in part, on the quantity of PBs that will be decoded after receiving the final modulation symbol.

FIG. 5 depicts a table 500 illustrating two scenarios in which a response interframe space may be adapted based on channel conditions in accordance with an embodiment of this disclosure.

Column 520 includes features that may be associated with a poor quality channel relative to a good quality channel described by column 540. The use of the terms poor and good in this disclosure are intended as relative to each other, for the purposes of describing two different channel conditions. Similarly, the terms lower, higher, less, more, as used in table 500 are relative between the first scenario in column 520 and the second scenario in column 540. A quality threshold may be used to determine whether a communications channel is a good quality channel or a poor quality channel. The quality threshold may be used with a characteristic of the communications channel, such as data rate, signal-to-noise ratio, bit error rate, attenuation, or the like.

In column 520, the poor quality channel may be associated with a lower data rate. For example, the MCS for the carriers in the poor quality channel may use fewer number of bits in each modulation. The overall data rate may be lower due to the conservative modulation rate for one or more carriers. Because fewer bits are included in each symbol and the PBs are a fixed or maximum length, the poor quality channel may be associated with fewer PBs in each modulation symbol. In particular, fewer PBs may end in the final modulation symbol. In the poor quality channel, the receiving device may determine to decrease the RIFS if less decoding time will be needed due to fewer PBs that end in the final symbol.

In column 540, the good quality channel may be associated with a higher data rate. For example, the MCS for the carriers in the good quality channel may use a greater number of bits in each modulation. The overall data rate may be higher due to the aggressive modulation rate for one or more carriers. Because more bits are included in each symbol, the good quality channel may be associated with more PBs in each modulation symbol. In particular, more PBs may end in the final modulation symbol. In the good quality channel, the receiving device may determine to increase the RIFS to allow more decoding time due to the greater quantity of PBs that end in the final symbol.

Some communication systems may define a maximum number of PBs that may be included in the final modulation symbol. However, this may result in inefficient use of the communications medium, especially on high data rate channels when the transmitter might pad empty data in the final modulation symbol to prevent exceeding the maximum number of PBs set by the communication system. As described further in FIG. 10, the RIFS may be adjusted to accommodate different quantities of PBs in the final modulation symbol responsive to channel conditions.

Figure 6:
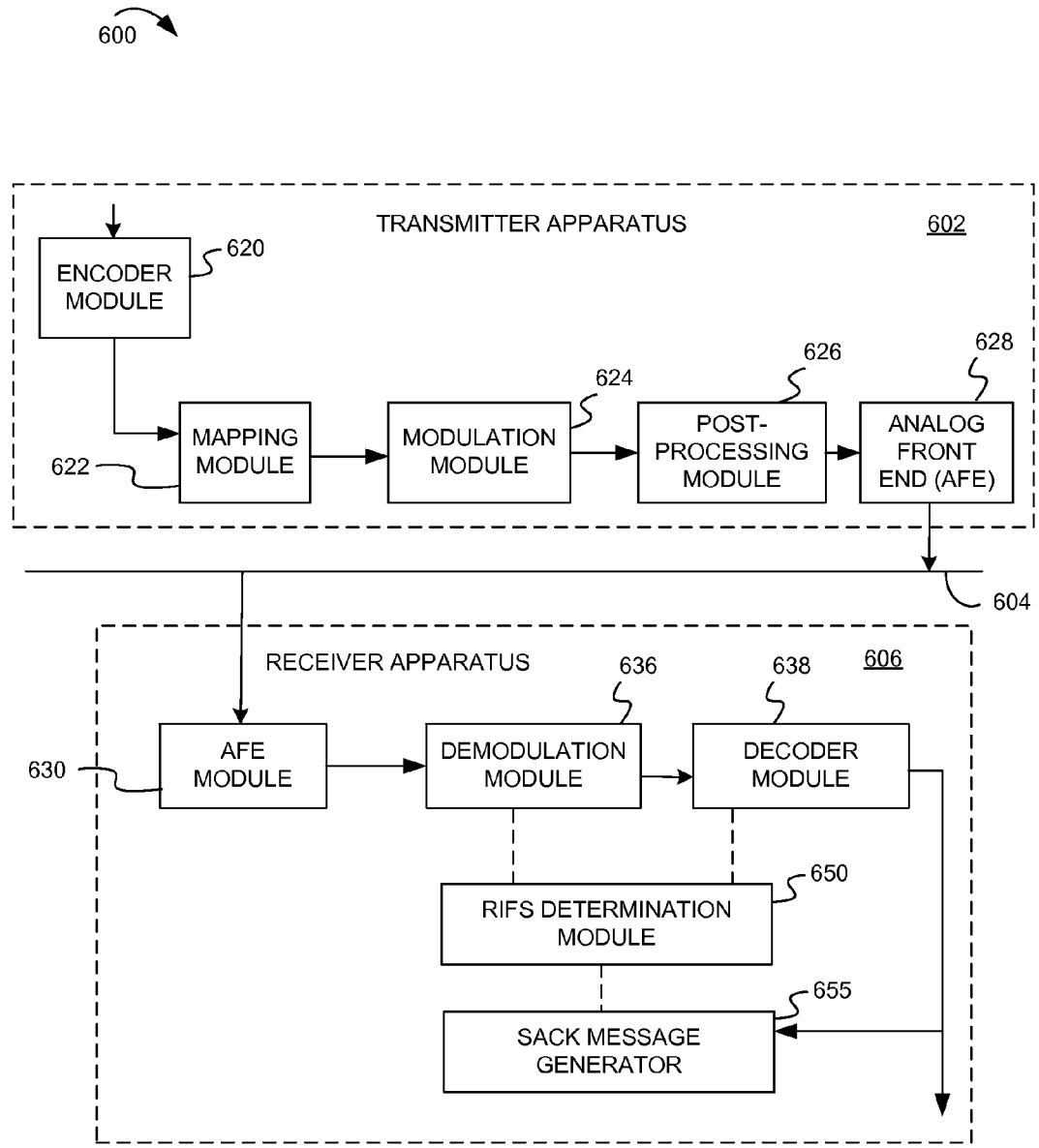
FIG. 6 depicts another example communication system in accordance with an embodiment of this disclosure.

FIG. 6 is a block diagram of a communication system 600 that includes a transmitter apparatus 602 for transmitting a signal (e.g., a sequence of OFDM symbols) over a communications medium 604 to a receiver apparatus 606. The transmitter apparatus 602 and receiver apparatus 606 can both be incorporated into a network interface (such as network interfaces 104, 124) at each device (e.g., first and second devices 110, 120). The communications medium 604 can represent a communications channel from one device to another over a wired or wireless network.

At the transmitter apparatus 602, modules implementing the PHY layer may receive a media access control (MAC) layer protocol data unit (MPDU) from the MAC layer (not shown). The MPDU is sent to an encoder module 620 to be processed, which may include scrambling, error correction coding and interleaving. The encoded MPDU may be referred to as the PPDU. The PPDU may have PBs as described previously, and in further detail in FIG. 7. The PPDU is fed into a mapping module 622 that takes groups of data bits (e.g., 1, 2, 3, 4, 6, 8, or 10 bits), depending on the constellation used for the current symbol (e.g., a BPSK, QPSK, 8-QAM, 15-QAM constellation), and maps the data value represented by those bits onto the corresponding amplitudes of in-phase (I) and quadrature-phase (Q) components of a carrier waveform of a modulation symbol. Alternatively, any appropriate mapping scheme that associates data values to modulated carrier waveforms can be used. The mapping module 622 may also determine the type of modulation to be used on each of the carriers (or "tones") according to a tone map. The tone map can be a default tone map, or a customized tone map provided by the receiver apparatus 606 in response to a channel estimation process.

A modulation module 624 performs the modulation of the resulting set of N complex numbers (some of which may be zero for unused carriers) determined by the mapping module 622 onto N orthogonal carrier waveforms having peak frequencies $f_1, \ldots, f_N$. The modulation module 624 performs an inverse discrete Fourier transform (IDFT) to form a discrete time symbol waveform. In one example, the data from the mapping module 622 is modulated onto subcarrier waveforms using an 8192-point inverse fast Fourier transform (IFFT), resulting in 8192 time samples which make up part of an OFDM symbol. The resulting time samples are in the time domain, while the input to the IDFT is in the frequency domain.

A post-processing module 626 may combine a sequence of consecutive (potentially overlapping) symbols into a "symbol set" that can be transmitted as a continuous block over the communications medium 604. The post-processing module 626 may prepend a preamble to the symbol set that can be used for automatic gain control (AGC) and symbol timing synchronization. An Analog Front End (AFE) module 628 couples an analog signal containing a continuous-time (e.g., low-pass filtered) version of the symbol set to the communications medium 604. Together, the encoder module 620, mapping module 622, modulation module 624, post-processing module 626 and AFE module 628 may be referred to as a TX chain of a transmitter. A PHY controller (not shown) may configure and manage various components of the transmitter, including those shown in the transmitter apparatus 602.

At the receiver apparatus 606, modules implementing the PHY layer may receive a signal from the communications medium 604 and generate a received MPDU for the MAC layer (not shown). An AFE module 630 may receive a received signal having the symbol set and send the received signal to a demodulation module 636. The demodulation module 636 may generate sampled signal data. The demodulation module 636 may also include a discrete Fourier transform (DFT) feature to translate the sampled received waveform into frequency domain data in the form of complex numbers. For example, in an OFDM system, demodulation may involve a fast Fourier transform (FFT). In single carrier systems, demodulation may involve a constellation demapping to convert the symbol to hard or soft bits.

The decoder module 638 may map the complex numbers onto the corresponding bit sequences and performs the appropriate decoding of the bits (including de-interleaving and descrambling). Together, the AFE module 630, demodulation module 636 and decoder module 638 may be referred to as an RX chain of a receiver. The RX chain may include other components (not shown), such as an equalizer, filters, automatic gain control, etc. A PHY controller (not shown) may manage and control the components of the receiver.

Also shown in FIG. 6, the receiver apparatus 606 may include a RIFS determination module 650 and a SACK message generator 655. The SACK message generator 655 may generate a SACK message to indicate the successful (acknowledgment) or unsuccessful (negative acknowledgment) decoding of PBs decoded from the symbol set. In one embodiment, the SACK message generator 655 may also generate and compress a BA bitmap to include in the acknowledgment message.

The RIFS determination module 650 may determine the RIFS based at least in part on a quantity of PBs that end in the final modulation symbol of the symbol set and the processing time associated with decoding the PBs. The RIFS determination module 650 may use characteristics of the decoder module 638 (such as processing speed, previous history of decoding time used for PBs in prior symbols of the symbol set, etc.) to determine the RIFS. The RIFS determination module 650 may control the SACK message generator 655 to prevent transmission of the acknowledgment message until the RIFS time period. Upon expiration of the RIFS time period, the RIFS determination module 650 may cause the SACK message generator 655 to send the acknowledgment message via a transmitter (not shown) of the receiver apparatus 606.

In various embodiments, any of the modules of the communication system 600 including modules in the transmitter apparatus 602 and receiver apparatus 606 can be implemented in hardware, firmware software, or any combination thereof.

Figure 7:
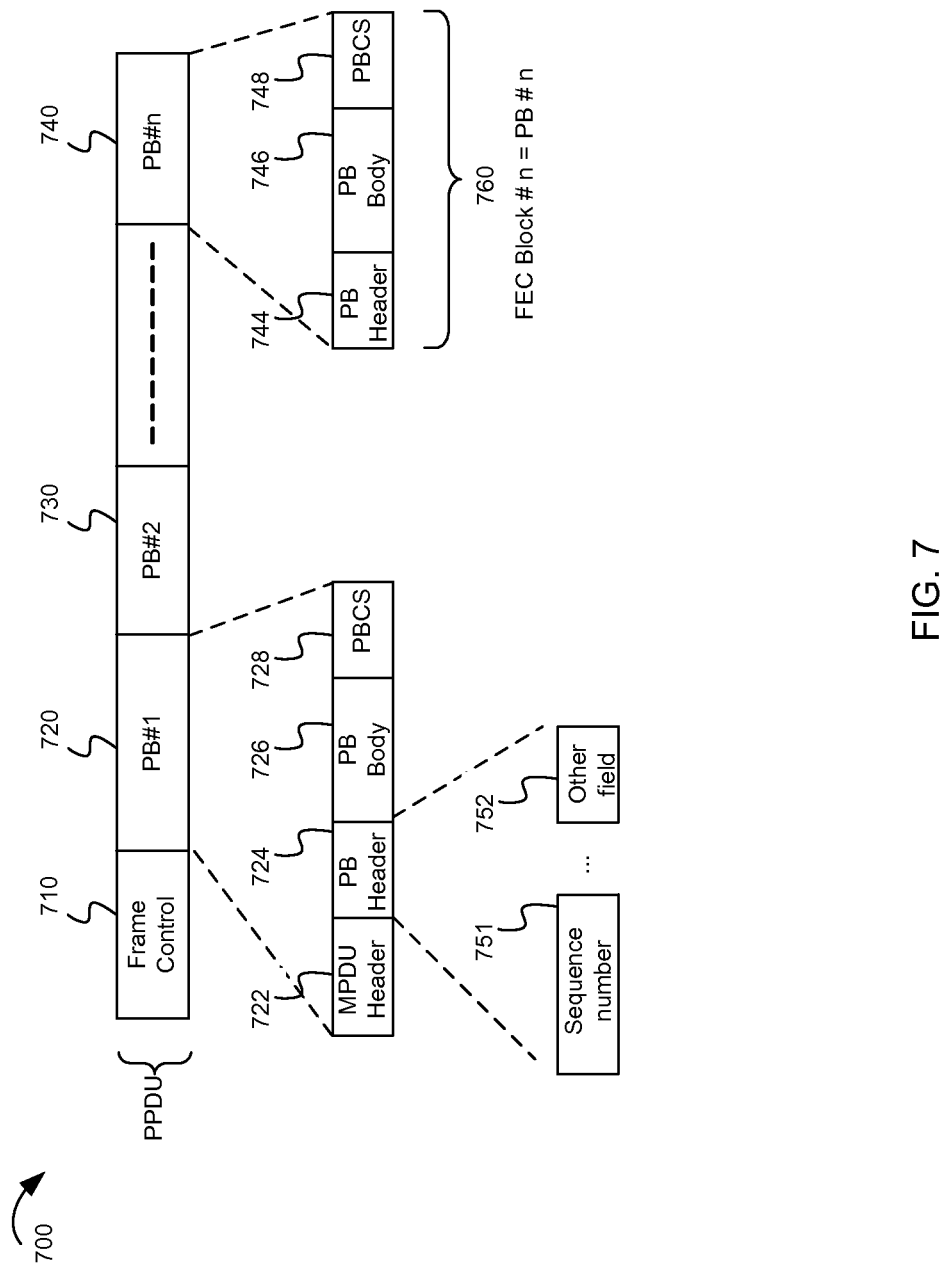
FIG. 7 depicts an example physical protocol data unit in accordance with an embodiment of this disclosure.

FIG. 7 depicts an example PPDU message format 700 in accordance with an embodiment of this disclosure. The example PPDU message format 700 includes a frame control 710, and one or more PBs, such as PB#1 720, PB#2 730, PB#n 740. In some example PPDU message formats, a preamble is also depicted as part of the PPDU. In some implementations, the preamble (not shown in FIG. 7) would be included prior to the frame control 710, and may be modulated prior to or with the frame control 710. The frame control 710 may span one or more symbols depending on the communication system configuration and type of message. The frame control 710 may also be referred to as a start of frame (SOF). The SOF contains information such as the address of the intended receiver, information needed by the receiver for demodulating the data etc. Together, the PBs (including PB#1 720, PB#2 730, and PB#n 740) may be referred to as the data portion of the PPDU.

Each PB may have a similar format. The first PB#1 720 may have an extra field, the MPDU header 722, which may provide information such as encoding information, encryption information, or subframe boundary information, that can be used by the receiver to reconstruct the MPDU. Otherwise, the first PB#1 720 includes portions that are similar to the other FEC blocks. The first PB#1 720 includes a PB header 724, PB body 726, and PB check sequence (PBCS) 728. The PB header 724 may include a sequence number 751 and various other fields 752. The sequence number 751 may uniquely identify the PB from the other PBs, such as PB#2 730 and PB#n 740. The PBCS 728 may be used by the receiver to verify that the PB#1 720 was properly decoded.

As shown in the example PPDU message format 700, other than the MPDU header 722, the other PBs may include PB header, PB body, and PBCS. For example the final PB#n 740 includes PB header 744, PB body 746, PBCS 748. Together the PB header 744, PB body 746, PBCS 748 make up a PB. In this disclosure, the terms PB and FEC block may be used interchangeably to refer to a PB that has been encoded using a forward error correction (FEC) coding scheme.

FIGS. 8A-8D depict example relationships between a physical layer protocol data unit and physical layer symbols in accordance with an embodiment of this disclosure. The number of bits that can be included in a modulation symbol may or may not match the number of bits associated with an FEC block. In the following figures, several examples are provided in which the number of bits (size) of a modulation symbol does not match the number of bits (size) of an FEC block. Each of FIGS. 8A-8D shows a PPDU having an SOF 810 and data 820. The data 820 may comprise a plurality of FEC blocks, which are modulated as symbols (e.g., OFDM symbols). Following transmission of a final modulation symbol, a RIFS 850 defines a RIFS time period before the SACK message 840 is transmitted in response to the PPDU. In the following examples, the size of the PBs is a fixed, uniform size. In some embodiments, the size of the PBs may be variable.

Figure 8A:
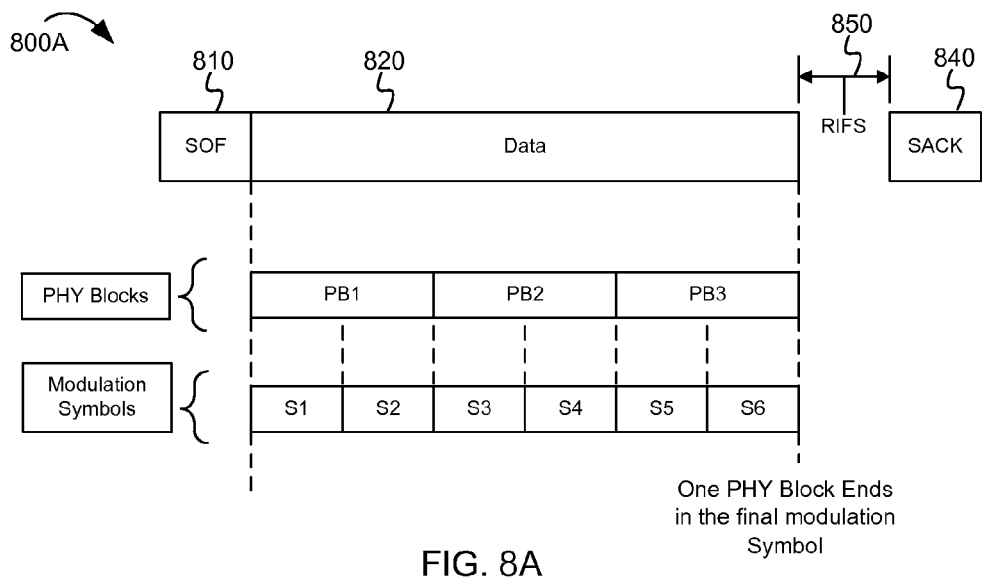
FIGS. 8A-8D depict example relationships between a physical layer protocol data unit and physical layer symbols in accordance with an embodiment of this disclosure.

FIG. 8A shows an example 800A in which each modulation symbol has 0.5 PHY blocks (or 1 PB spans two modulation symbols). In FIG. 8A, the PPDU that contains 3 PHY Blocks (PB1 to PB3) that are modulated using 6 modulation symbols (S1 to S6). As such, each PB is spread over two modulation symbols. PB3 spans two symbols S5, S6. In this example, once the receiver receives symbol S6 it needs to decode one PB (PB3).

Figure 8B:
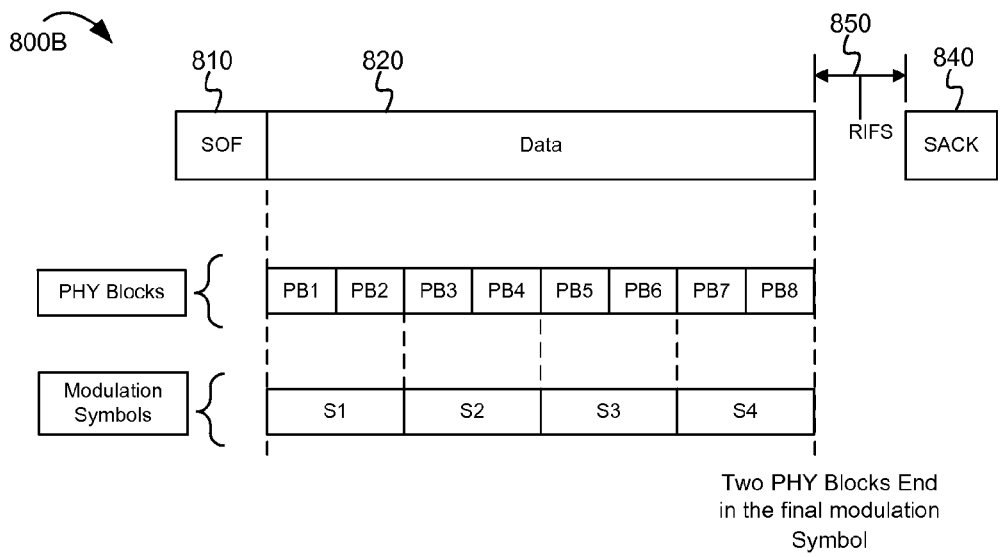

FIG. 8B shows an example 800B in which each modulation symbol has two PHY blocks (or symbol carries half a PB). In FIG. 8B, the PPDU that contains 8 PHY Blocks (PB1 to PB8) that are modulated using 4 modulation symbols (S1 to S4). Symbol S4 contains two PHY Blocks, PB7 and PB8. In this example, once the receiver receives symbol S4 it needs to decode two PBs (PB7 and PB8).

Figure 8C:
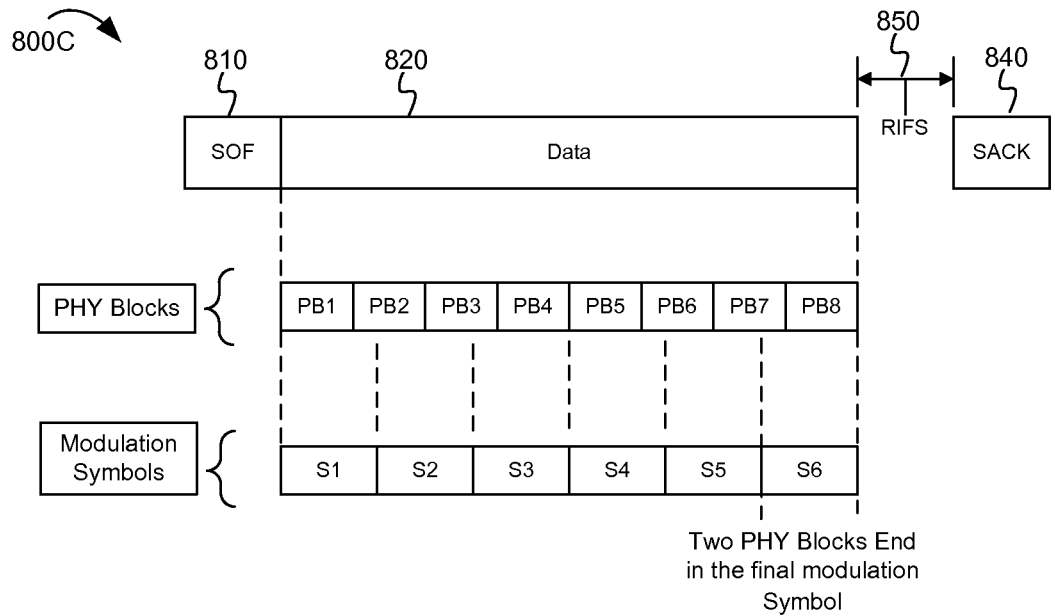

FIG. 8C shows an example 800C in which the size of PHY blocks and the symbol bit rate are not aligned. In FIG. 8C, the PPDU that contains 8 PHY Blocks (PB 1 to PB8) that are modulated using 6 modulation symbols (S1 to S6). Symbol S6 includes a portion of PB7 and PB8. In this example, once the receiver receives symbol S6 it needs to decode two PBs (PB7 and PB8). Even though part of PB7 is included in symbol S5, it is noted that the receiver may not decode PB7 until after receiving symbol S6.

Figure 8D:
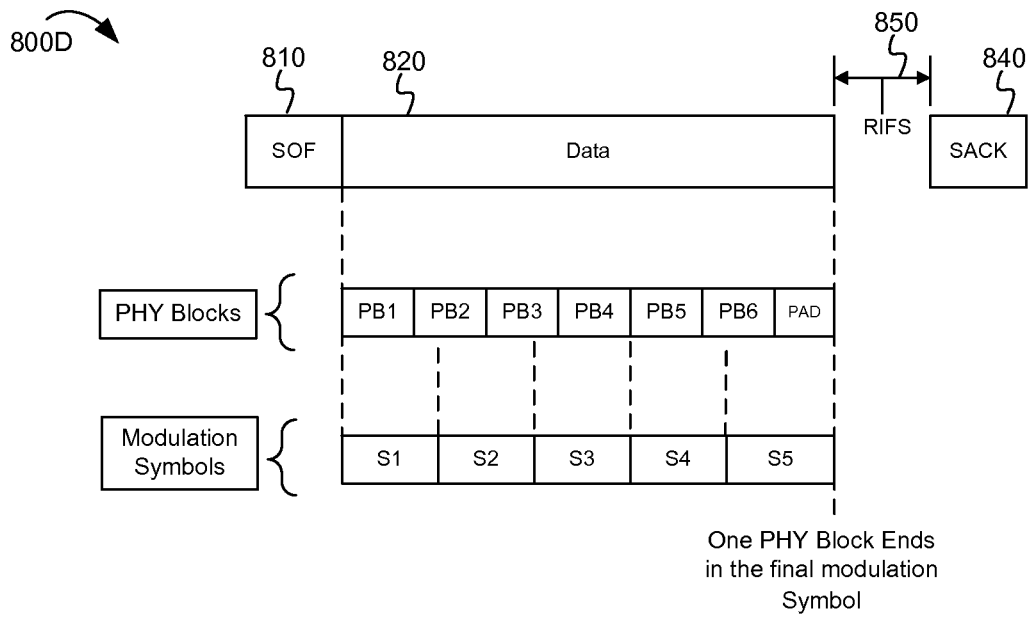

FIG. 8D shows another example 800D in which the size of PHY blocks and the symbol bit rate are not aligned. In FIG. 8D, the PPDU that contains 6 PHY Blocks (PB1 to PB6) that are modulated using 5 modulation symbols (S1 to S5). Symbol S5 includes a portion of PB6 and may include padding (denoted as "PAD"). The PAD may represent empty data in the final modulation symbol, such as when there are not enough bits remaining in the final modulation symbol to include another FEC encoded block or when there are no more FED encoded blocks to transmit. Even though part of PB6 is included in symbol S4, it is noted that the receiver may not decode PB6 until after receiving symbol S5. In this example, once the receiver receives symbol S5 it needs to decode one PB (PB6).

This example illustrates the inter-relation between PHY data rate and RIFS. A receiving device decodes the PHY blocks in the received symbols to determine whether the PHY is properly decoded. Before an acknowledgment message can be generated, each PHY block in the final symbol of the PPDU will be decoded. However, the decoding time used to decode two PHY blocks is longer than the decoding time used to decode one PHY block. As shown in FIGS. 8A-8D, the PHY configuration for PHY blocks and the transmission symbol characteristics may result in a different quantity of PHY blocks that end in the final symbol of the PPDU. In implementations where decoding each PHY Blocks requires a fixed amount of time, RIFS interval required in FIGS. 8A and 8D is smaller than the RIFS interval required in FIGS. 8B and 8C.

In some scenarios, the number of PHY Blocks that can end in the final modulation symbol can depend on the PPDU duration. These examples illustrate the dependency of PPDU duration (i.e., number of modulation symbols) on the required RIFS.

Figure 9:
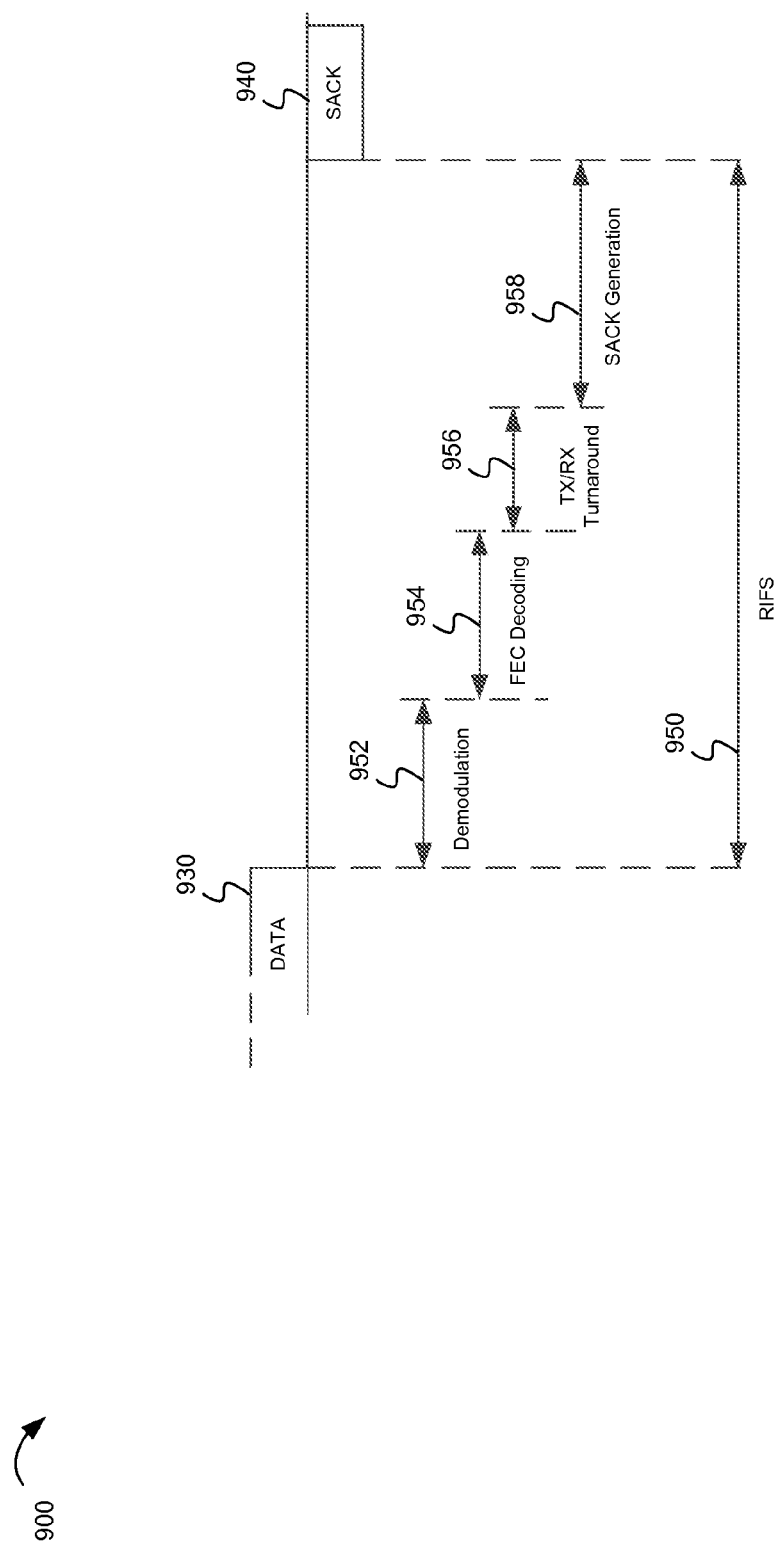
FIG. 9 depicts example operations performed by a receiving device during a response interframe space in accordance with an embodiment of this disclosure.

FIG. 9 depicts an example timing diagram 900 showing operations performed by a receiving device during a response interframe space in accordance with an embodiment of this disclosure. In the example timing diagram 900 of FIG. 9, the RIFS 950 follows receipt of data 930 and before sending a SACK message 940 in response to the data 930.

During the RIFS 950, the receiver may perform several operations. During demodulation time period 952 the receiver may demodulate the final modulation symbol of the data 930. During FEC decoding time period 954, the receiver may decode the PBs that end in the final modulation symbol. During TX/RX turnaround time period 956, the communications device may change a transceiver from a receive mode to a transmit mode to allow transmission of the SACK message 940. During acknowledgment generation time period 958, the receiver may generate the SACK message 940.

The demodulation time period 952, TX/RX turnaround time period 956, and acknowledgment generation time period 958 may be relatively stable (e.g., it may not be possible to adjust those times) based at least in part on the processor of the receiver. For instance, the time for demodulation may be determined by an implementation of an integrated circuit that performs the demodulation, and the demodulation time period 952 may not vary. However, the decoding time period 954 may have a potential to change for each transmission.

During the decoding time period 954, the receiver may perform operations for each PB included in the final modulation symbol. The decoding may continue until the PB is successfully decoded (for instance, the CRC can be checked to see if the PB has decoded successfully), or until a certain number of decoding iterations have occurred, or until the decoding time period 954 has expired. If the PB has not been successfully decoded after the maximum number of decoding iterations or the expiration of the decoding time period 954, a negative acknowledgment for the PB will be conveyed to the transmitter in the SACK message.

In accordance with an embodiment of this disclosure, the FEC decoding time period 954 may be increased or decreased in relation to how many PBs end in the final modulation symbol of a PPDU. A per-PB decoding time may be multiplied by a quantity of PBs ending in the final modulation symbol to determine the FEC decoding time period 954 that will be needed. By determining an FEC decoding time period 954 based on the quantity of PBs that ends in the final modulation symbol, the receiver may be able to determine a RIFS 950 that is sufficient to decode the PBs without causing unnecessary delay for the SACK message 940.

Figure 10:
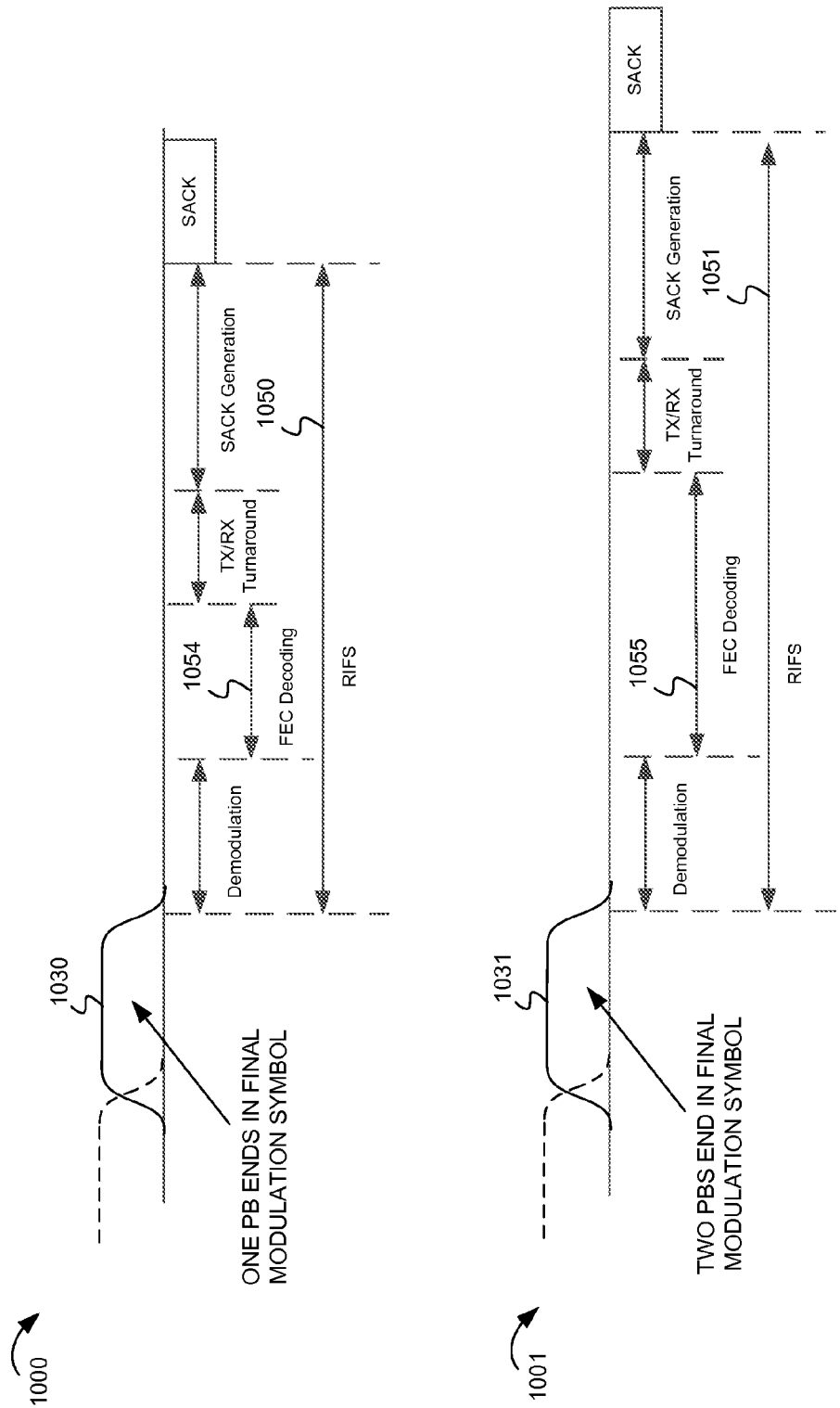
FIG. 10 depicts a timing diagram related to decoding a final modulation symbol in accordance with an embodiment of this disclosure.

FIG. 10 depicts example timing diagrams related to determining a RIFS in accordance with an embodiment of this disclosure. In the examples, the amount of decoding time $T_{dec}$ needed to decode a PB may be represented by the following equation:

$$T_{dec} = nPBs \cdot x \qquad (1)$$

where nPBs is the number of PBs that end in the final modulation symbol and x represents a decoding time needed to decode each PB. For example, x may be a fixed value, empirically-derived value, or determined as an average decoding time of previous PBs. For example, a decoder module (such as decoder module 638) may maintain a history of decoding time for n previously decoded PBs. The history of decoding time for n previously decoded PBs may be used to determine an average decoding time per PB.

The RIFS time period may be determined based, at least in part, on the decoding time $T_{dec}$. For example, the RIFS time period $T_{RIFS}$ may be represented by the equation:

$$T_{RIFS} = T_{dec} + T_{other} \qquad (2)$$

where $T_{other}$ represents the sum of other fixed or predetermined time periods for activities performed during the RIFS, including the demodulation time period 952, TX/RX turnaround time period 956, and acknowledgment generation time period 958 described in FIG. 9.

FIG. 10 provides two illustrative examples. In the following examples, x may be 5 μs/PB and $T_{other}$ may be 20 μs. A first example timing diagram 1000 illustrates an example where only one PB ends in the final modulation symbol 1030. The FEC decoding time period 1054 may be determined using eq(1) above as nPBs*x=1 PB*5 μs/PB=5 μs. Therefore, the RIFS time period $T_{RIFS}$ 1050 may be determined using eq(2) as 25 μs.

A second example timing diagram 1001 illustrates an example where two PBs ends in the final modulation symbol 1031. The decoding time period 1055 may be determined using eq(1) above as nPBs*x=2 PB*5 μs/PB=10 μs. Therefore, the RIFS time period $T_{RIFS}$ 1051 may be determined using eq(2) as 30 μs.

Figure 11:
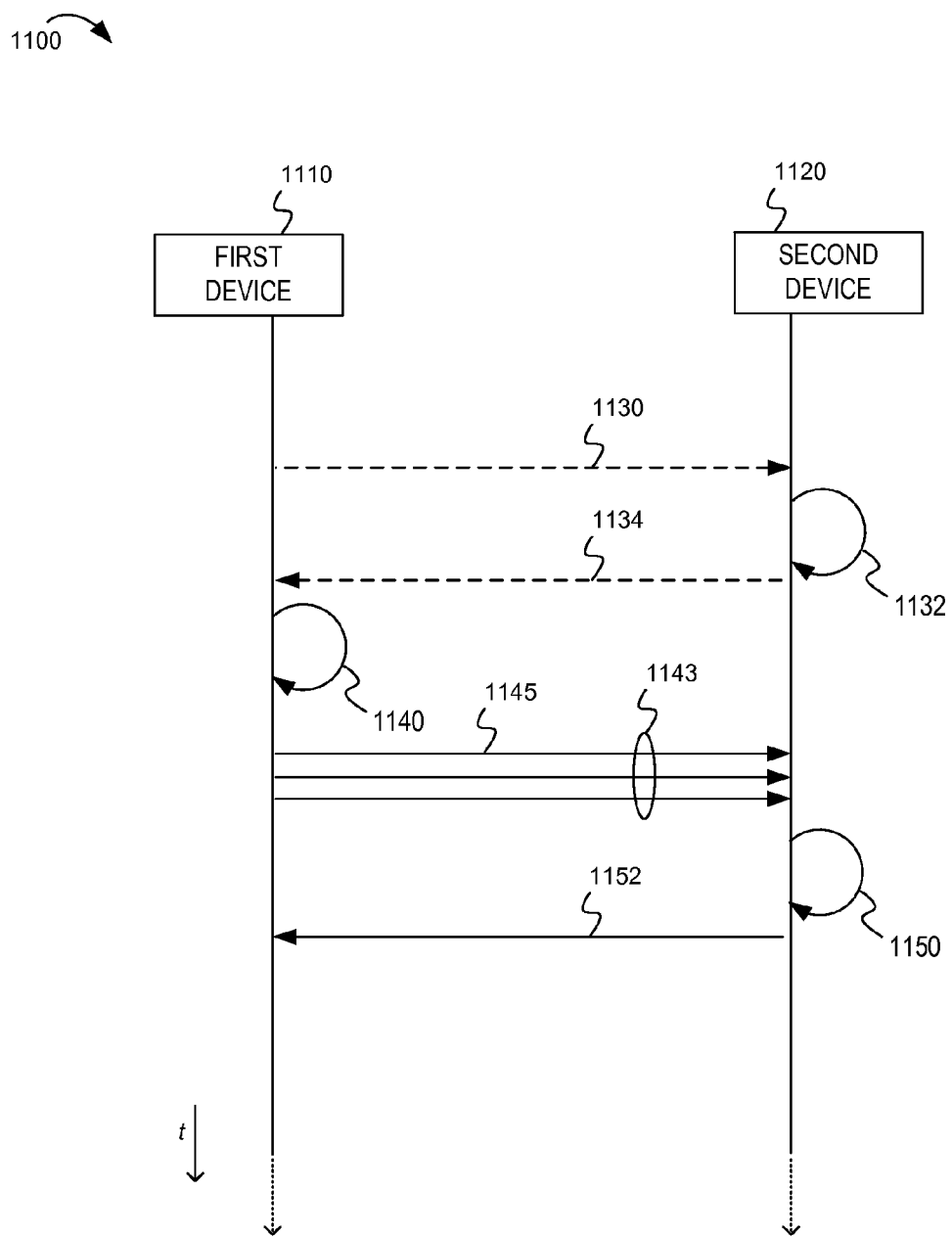
FIG. 11 depicts an example message flow in which a response interframe space may be used in accordance with an embodiment of this disclosure.

FIG. 11 depicts an example message flow 1100 in which a response interframe space may be used in accordance with an embodiment of this disclosure. A first device 1110 (e.g., transmitting device) and a second device 1120 (e.g., receiving device) may be coupled by a communications medium (not shown). FIG. 11 illustrates one mechanism by which the first device 1110 and second device 1120 may communicate about a RIFS determined by the second device 1120 based on channel conditions and/or processing time for decoding a final modulation symbol of a PPDU.

At 1130, a prior transmission from the first device 1110 to the second device 1120 may be used to determine channel quality. For example, the prior transmission may be sounding messages transmitted as part of a channel estimation process. Alternatively, the prior transmission may be a previous PPDU. At 1132, the second device 1120 may determine the channel quality based on the prior transmission. For example, sounding symbols or data symbols with known MCS values may be transmitted by the first device 1110. Based at least in part on the sounding symbols from the first device 1110, the second device 1120 may compute various metrics about the channel quality, such as signal to noise ratio, signal attenuation, block error rate, bit error rate, etc. The second device 1120 may determine what MCS should be used by the first device 1110 for subsequent transmissions. In a multicarrier system, each carrier may have a different modulation value so the MCS comprises of a vector of modulation values (one per carrier) and a common code rate applicable to all carriers.

Furthermore at 1132, the second device 1120 may determine a RIFS that is appropriate for the channel conditions. In one example, the second device 1120 may estimate the structure of the PPDU format that the first device 1110 will use based, at least in part, on the channel conditions and/or physical layer configuration properties. For example, the second device 1120 may determine a size if the PPDU and determine the number of modulation symbols that will be used to transmit the PPDU. The second device 1120 may also determine how many PBs will be included in the PPDU. Based on the number of PBs for a PPDU format and the number of modulation symbols to transmit the PPDU, the second device 1120 may estimate how many PBs will end in the final modulation symbol of the PPDU. The RIFS may be determined relative to how many PBs will end in the final modulation symbol of the PPDU.

At 1134, the second device 120 may communicate the RIFS to the first device 1110 as part of a management message. An example management message is described in FIG. 13. The management message may be sent as part of a channel estimation process, such as in a channel estimation results message. The management message may also be sent together with a tone map or other physical layer configuration properties.

At 1140, the first device 1110 may prepare a PPDU for transmission to the second device 1120. At 1143, a symbol set may be transmitted to the second device 1120. Each symbol 1145 may include a portion of a PB, a complete PB, or more than one PB. At 1150, the second device 1120 may process the received symbol set, including a final modulation symbol. The second device 1120 may utilize the RIFS to decode the PBs in the final modulation symbol and prepare an acknowledgment message. At 1152, after the RIFS time period, the second device 1120 may transmit the acknowledgment message to the first device 1110. The first device 1110 may sense the communications medium for the acknowledgment message starting at the time following the RIFS time period.

Figure 12:
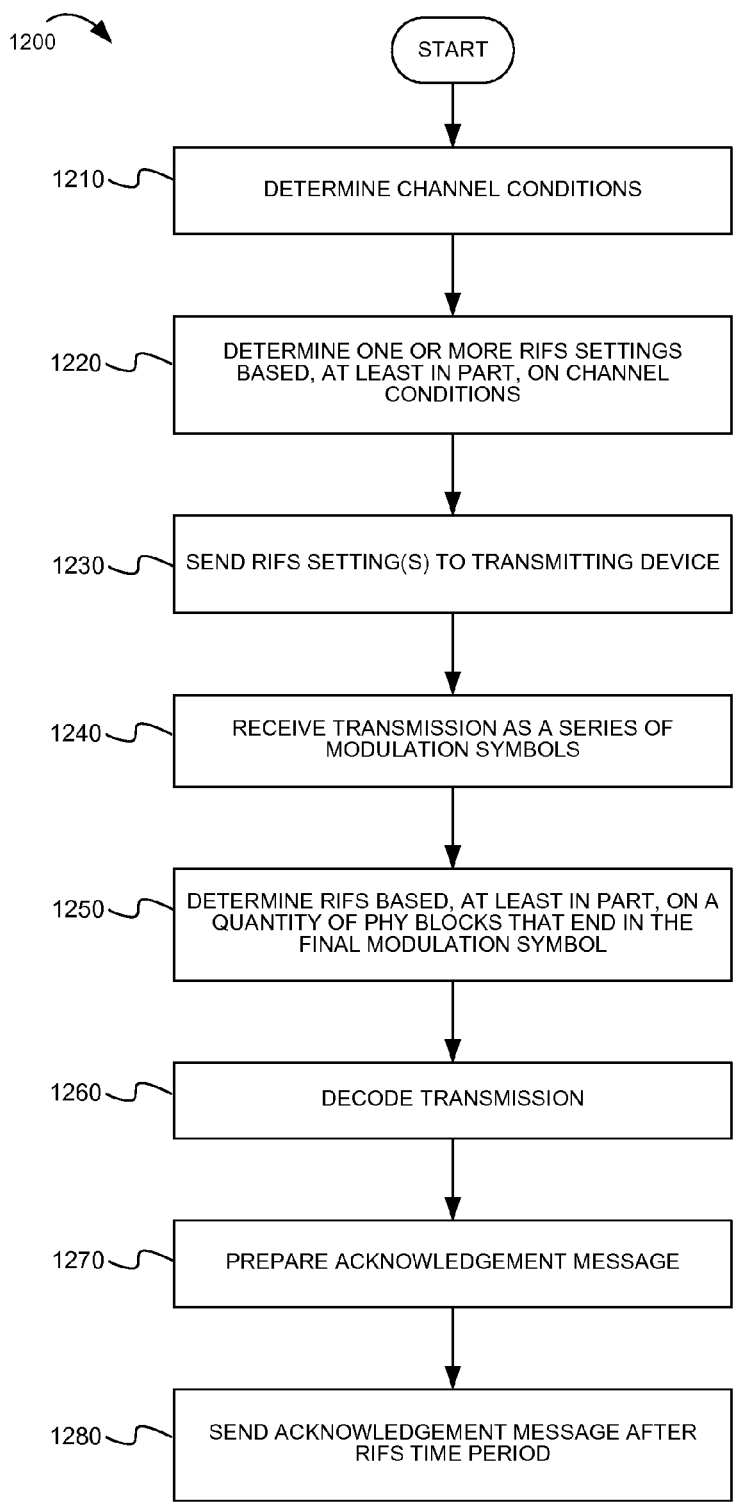
FIG. 12 depicts another flow chart with example operations for determining and communicating an adaptable response interframe space in accordance with an embodiment of this disclosure.

FIG. 12 depicts another flow chart 1200 with example operations related to an adaptable response interframe space in accordance with an embodiment of this disclosure.

At block 1210, an apparatus (such as second device 120, receiver apparatus 606 or second device 1120) may determine channel conditions associated with a communications channel between a first device and the apparatus. For example, channel conditions may define a PHY data rate, symbol bit rate, block error rate, bit error rate, or the like.

At block 1220, the apparatus may determine one or more RIFS settings based, at least in part, on the channel conditions. At block 1230, the apparatus may send RIFS setting(s) to the transmitting device. In one example, the RIFS setting(s) may be included in a Management Message (MME). The MME may include more than one RIFS setting, such as when different data rates may be used on the communications channel. In one example, an MME may include multiple tone maps, each having a different corresponding data rate and RIFS setting.

At block 1240, the apparatus may receive transmission as a series of modulation symbols. At block 1250, the apparatus may determine the RIFS (perhaps from among the RIFS settings determined in block 1220) to use with the PPDU. The RIFS may be determined based at least in part on a quantity of PBs that end in the final modulation symbol.

At block 1260, the apparatus may decode the transmission, including the PBs that end in a final modulation symbol of the transmission. At block 1270, the apparatus may prepare an acknowledgment message. At block 1280, the apparatus may send the acknowledgment message after the RIFS time period (determined at block 1250).

Figure 13:
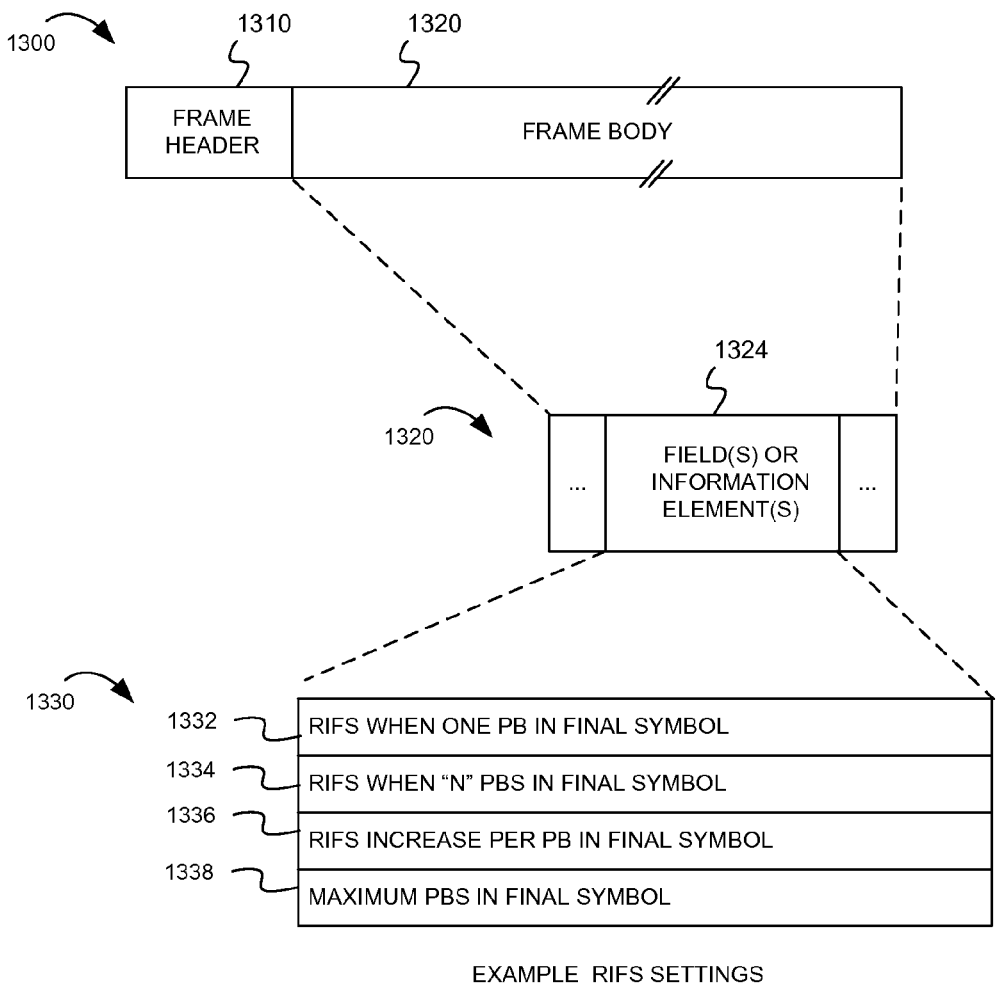
FIG. 13 depicts an example management message for communicating a determined response interframe space time period in accordance with an embodiment of this disclosure.

FIG. 13 depicts an example management message (MME) 1300 for communicating between a transmitting device and a receiving device. The MME 1300 may include a frame header 1310 and a frame body 1320. Other portions of the MME are not shown but may be included in other example MME message formats.

The frame body 1320 may comprise one or more fields or information elements, such as field or information element 1324. FIG. 13 include several example RIFS settings 1330 that may be included in a fields or information element 1324 of the MME 1340. Examples of RIFS settings include:

As example 1332, a value may indicate a first RIFS time period to use when one PB is in the final symbol. A first device and a second device may both use the first RIFS time period after a PPDU in which one PB ends in the final modulation symbol of the PPDU. In implementations where different data rates or physical layer properties may be used, the MME may include more than one RIFS value, such as a vector of RIFS values that are associated with corresponding tone maps.

As example 1334, a value may indicate a second RIFS time period to use when nPBs PBs are included in the final symbol. For example, the second RIFS time period may be used when 2 PBs are included in the final symbol. A first device and a second device may both use the second RIFS time period after a PPDU in which nPBs PBs end in the final modulation symbol of the PPDU. The MME may include a plurality of RIFS time periods, for various values of nPBs.

As example 1336, a value may indicate an RIFS increase per PB in the final symbol. The RIFS increase may be used to adjust the RIFS time period based on how many PBs are included in the final symbol. For example, the RIFS increase may be related to the $T_{dec}$ decoding time associated with decoding a single PB. A first device and a second device may both use the RIFS increase to determine the RIFS for a particular PPDU.

As example 1338, a value may indicate a maximum number of PBs that may be included in a final symbol of a PPDU. A receiving device may limit the maximum number of PBs that can be included in the final symbol and set a RIFS value (such as example 1334) that corresponds with the maximum number of PBs.

Figure 14:
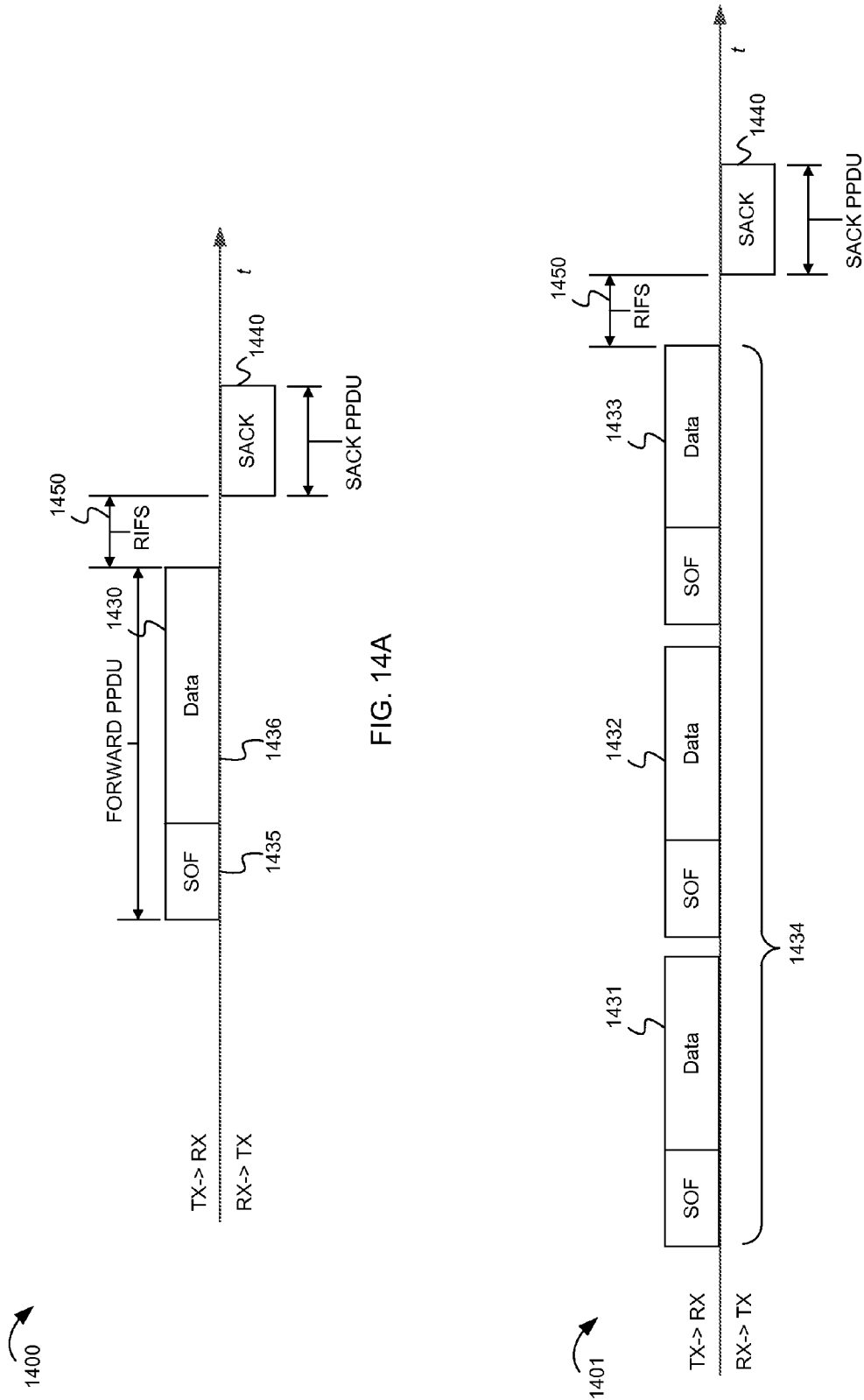
FIGS. 14A-14B depict example transmissions in which an adaptable response interframe space may be used in accordance with an embodiment of this disclosure.

FIGS. 14A-14B depict example transmissions showing RIFS in context of a single PPDU in FIG. 14A and a burst of PPDUs in FIG. 14B. In the example 1400 of FIG. 14A, a PPDU 1430 comprises a SOF 1435 and a data portion 1436. The data portion may be made of a series of PBs and may be transmitted as a series of modulation symbols. The RIFS 1450 follows a final modulation symbol of the PPDU 1430. The SACK message 1440 is transmitted (from the receiving device to transmitting device) after the RIFS 1450.

In a communication system that supports a burst of PPDUs, the transmitting device may send several PPDUs consecutively. Such as the example 1401 of FIG. 14B, the transmitter may transmit a first PPDU 1431, followed by a second PPDU 1432, and a third PPDU 1433. The RIFS 1450 follows the final modulation symbol of the third PPDU 1433 (e.g., the final PPDU in the burst).

Various example embodiments have been described wherein a receiving device or a transmitting device may determine an RIFS based on a quantity of PBs that end in a final modulation symbol of a PPDU. The determined RIFS may be referred to as a custom RIFS, adapted RIFS, or channel-specific RIFS. The custom RIFS may be associated with a particular receiver or may be associated with a group of receivers. For example, receivers that belong to a group (e.g., by manufacturer, model number, group identifier, network identifier, etc.) may utilize the custom RIFS, while other receivers not belonging to the group may utilize a standardized or fixed value RIFS associated with the communication system. In some embodiments, the custom RIFS may be associated with a particular PPDU or group of PPDUs. For example, depending on the type of encoding used for the PBs, the decoding time may change for a receiver. A receiver may indicate a custom RIFS associated with different encoding schemes that a transmitter may use to transmit various PPDUs.

FIGS. 1-14B and the operations described herein are examples meant to aid in understanding various embodiments and should not be used to limit the scope of the claims. Embodiments may perform additional operations, fewer operations, operations in parallel or in a different order, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 15:
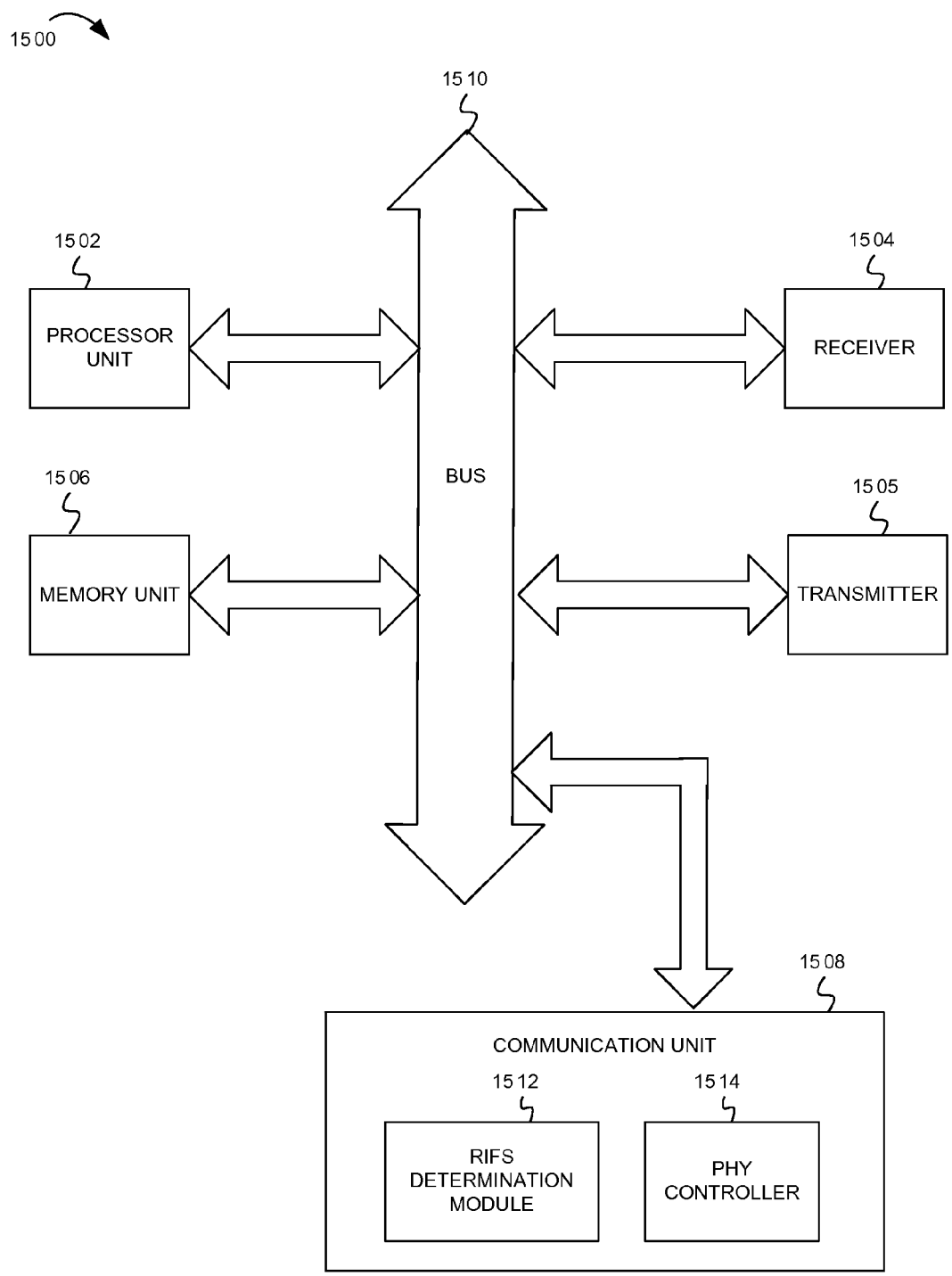
FIG. 15 depicts an example electronic device capable of implementing various embodiments of this disclosure.

FIG. 15 is an example block diagram of one embodiment of an electronic device 1500 capable of determining a RIFS in accordance with various embodiments of this disclosure. In some implementations, the electronic device 1500 may be an electronic device such as a laptop computer, a tablet computer, a mobile phone, a powerline communication device, a gaming console, or other electronic systems. In some implementations, the electronic device may comprise functionality to communicate across multiple communication networks (which form a hybrid communication network). The electronic device 1500 includes a processor unit 1502 (possibly including multiple processors, multiple cores, multiple nodes, and/or implementing multi-threading, etc.). The electronic device 1500 includes a memory unit 1506. The memory unit 1506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1500 also includes a bus 1510 (e.g., PCI, ISA, PCI-Express, HyperTransport®, InfiniBand®, NuBus, AHB, AXI, etc.). The electronic one or more network interfaces that may be a wireless network interface (e.g., a WLAN interface, a Bluetooth® interface, a WiMAX interface, a ZigBee® interface, a Wireless USB interface, etc.) or a wired network interface (e.g., a powerline communication interface, an Ethernet interface, etc.).

The electronic device 1500 may include a transmitter 1505 and a receiver 1504. Together the transmitter 1505 and receiver 1504 may comprise a network interface (such as network interface 104, 124). The electronic device 1500 may include a PHY controller 1514 to manage physical layer components of the network interface. The electronic device 1500 may also include an RIFS determination module 1512 (similar to RIFS determination module 126, 650). In some implementations, the PHY controller 1514 and RIFS determination module 1512 may comprise part of a communication unit 1508.

Any one of these functionalities may be partially (or entirely) implemented in hardware and/or on the processor unit 1502. For example, the functionality may be implemented with an application specific integrated circuit, in logic implemented in the processor unit 1502, in a co-processor on a peripheral device or card, etc. Further, realizations may include fewer or additional components not illustrated in FIG. 15 (e.g., video cards, audio cards, additional network interfaces, peripheral devices, etc.). The processor unit 1502, the memory unit 1506, transmitter 1505, receiver 1504, and communication unit 1508 may be coupled to the bus 1510. Although illustrated as being coupled to the bus 1510, the memory unit 1506 may be directly coupled to the processor unit 1502.

While the embodiments are described with reference to various implementations and exploitations, it will be understood that these embodiments are illustrative and that the scope of the present subject matter is not limited to them. In general, techniques for determining a RIFS as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present subject matter.

What is claimed is:

1. A method comprising:
   sending a first configuration message via a communications medium, the first configuration message indicating a maximum quantity of physical layer (PHY) blocks that can be included in a final modulation symbol associated with a PHY protocol data unit (PPDU);
   receiving, via the communications medium, the PPDU that includes multiple PHY blocks, the PPDU received as a series of modulation symbols;
   determining a response interframe space (RIFS) time period based, at least in part, on a quantity of PHY blocks that end in the final modulation symbol of the PPDU; and
   sending, via the communications medium, an acknowledgment message responsive to receiving the PPDU after the RIFS time period following the final modulation symbol.

2. The method of claim 1, wherein the RIFS time period is based, at least in part, on a processing time associated with decoding the quantity of PHY blocks that end in the final modulation symbol.

3. The method of claim 1, wherein the quantity of PHY blocks that end in the final modulation symbol is based at least in part on channel conditions of the communications medium.

4. The method of claim 3, wherein the PPDU is received from a first device, and wherein the channel conditions comprise at least one of a data rate, an error rate, or a signal quality associated with prior transmissions received from the first device.

5. The method of claim 3, further comprising:
   estimating the quantity of PHY blocks that will end in the final modulation symbol based at least in part on the channel conditions of the communications medium.

6. The method of claim 5, wherein the RIFS time period is determined prior to receiving the PPDU.

7. The method of claim 1, further comprising:
   determining a plurality of RIFS time periods including a first RIFS time period for use when one PHY block ends in the final modulation symbol and at least one other RIFS time period for use when more than one PHY block ends in the final modulation symbol.

8. The method of claim 7, further comprising:
   sending a second configuration message to a transmitting device, wherein the second configuration message indicates the plurality of RIFS time periods.

9. The method of claim 8, wherein the second configuration message comprises a management message or a tone map message.

10. The method of claim 1, wherein the RIFS time period is further based, at least in part, on a size of the PPDU and a quantity of modulation symbols associated with the size of the PPDU.

11. The method of claim 1, wherein the acknowledgment message is a selective acknowledgment (SACK) message that indicates whether one or more PHY blocks of the PPDU were properly decoded.

12. The method of claim 1, wherein the communications medium is one of a wireless communications channel, a power line communications medium, or a mobile telecommunications wireless medium.

13. The method of claim 1, wherein the series of modulation symbols comprises orthogonal frequency division multiplexing (OFDM) symbols.

14. An apparatus comprising:
   a receiver for coupling to a communications medium, the receiver configured to:
      send a first configuration message via the communications medium, the first configuration message indicating a maximum quantity of physical layer (PHY) blocks that can be included in a final modulation symbol associated with a PHY protocol data unit (PPDU), and
      receive, via the communications medium, the PPDU that includes multiple PHY blocks, the PPDU received as a series of modulation symbols;
   a response interframe space (RIFS) determination module configured to determine a RIFS time period based, at least in part, on a quantity of PHY blocks that end in the final modulation symbol of the PPDU; and
   a transmitter configured to send an acknowledgment message responsive to receiving the PPDU after the RIFS time period following the final modulation symbol.

15. The apparatus of claim 14, wherein the RIFS time period is based, at least in part, on a processing time associated with decoding the quantity of PHY blocks that end in the final modulation symbol.

16. The apparatus of claim 14, further comprising:
   a PHY controller configured to estimate the quantity of PHY blocks that will end in the final modulation symbol based at least in part on channel conditions of the communications medium.

17. The apparatus of claim 14, further comprising:
the RIFS determination module further configured to determine a plurality of RIFS time periods including a first RIFS time period for use when one PHY block ends in the final modulation symbol and at least one other RIFS time period for use when more than one PHY block ends in the final modulation symbol.

18. The apparatus of claim 17, further comprising:
a PHY controller configured to send a second configuration message via the transmitter, wherein the second configuration message indicates the plurality of RIFS time periods.

19. The apparatus of claim 14, wherein the RIFS time period is further based, at least in part, on a size of the PPDU and a quantity of modulation symbols associated with the size of the PPDU.

20. A non-transitory computer readable medium storing instructions which, when executed by one or more processors of a device, cause the device to:
send a first configuration message via a communications medium, the first configuration message indicating a maximum quantity of physical layer (PHY) blocks that can be included in a final modulation symbol associated with a PHY protocol data unit (PPDU);
receive, via the communications medium, the PPDU that includes multiple PHY blocks, the PPDU received as a series of modulation symbols;
determine a response interframe space (RIFS) time period based, at least in part, on a quantity of PHY blocks that end in the final modulation symbol of the PPDU; and
send, via the communications medium, an acknowledgment message responsive to receiving the PPDU after the RIFS time period following the final modulation symbol.

21. The non-transitory computer readable medium of claim 20, storing further instructions which, when executed by the one or more processors of the device, cause the device to:
determine the RIFS time period based, at least in part, on a processing time associated with decoding the quantity of PHY blocks that end in the final modulation symbol.

22. The non-transitory computer readable medium of claim 20, storing further instructions which, when executed by the one or more processors of the device, cause the device to:
estimate the quantity of PHY blocks that will end in the final modulation symbol based at least in part on channel conditions of the communications medium.

23. The non-transitory computer readable medium of claim 20, storing further instructions which, when executed by the one or more processors of the device, cause the device to:
determine a plurality of RIFS time periods including a first RIFS time period for use when one PHY block ends in the final modulation symbol and at least one other RIFS time period for use when more than one PHY block ends in the final modulation symbol.

24. The non-transitory computer readable medium of claim 23, storing further instructions which, when executed by the one or more processors of the device, cause the device to:
send a second configuration message via the communications medium, wherein the second configuration message indicates the plurality of RIFS time periods.

25. A communication device comprising:
means for sending a first configuration message via a communications medium, the first configuration message indicating a maximum quantity of physical layer (PHY) blocks that can be included in a final modulation symbol associated with a PHY protocol data unit (PPDU);
means for receiving, via the communications medium, the PPDU that includes multiple PHY blocks, the PPDU received as a series of modulation symbols;
means for determining a response interframe space (RIFS) time period based, at least in part, on a quantity of PHY blocks that end in the final modulation symbol of the PPDU; and
means for sending, via the communications medium, an acknowledgment message responsive to receiving the PPDU after the RIFS time period following the final modulation symbol.

26. The communication device of claim 25, further comprising:
means for determining the RIFS time period based, at least in part, on a processing time associated with decoding the quantity of PHY blocks that end in the final modulation symbol.

27. The communication device of claim 25, further comprising:
means for determining a plurality of RIFS time periods including a first RIFS time period for use when one PHY block ends in the final modulation symbol and at least one other RIFS time period for use when more than one PHY block ends in the final modulation symbol.

28. The communication device of claim 27, further comprising:
means for sending a second configuration message via the communications medium,
wherein the second configuration message indicates the plurality of RIFS time periods.

* * * * *